United States Patent
Osinusi et al.

(10) Patent No.: US 8,958,754 B2
(45) Date of Patent: Feb. 17, 2015

(54) SYSTEM AND METHOD FOR SUB-COHERENT INTEGRATION FOR GEO-LOCATION USING WEAK OR INTERMITTENT SIGNALS

(75) Inventors: Tosin Osinusi, Bethesda, MD (US); Martin Alles, Vienna, VA (US); Tom Gravely, Herndon, VA (US)

(73) Assignee: Andrew, LLC, Hickory, NC (US)

( * ) Notice: Subject to any disclaimer, the term of this patent is extended or adjusted under 35 U.S.C. 154(b) by 811 days.

(21) Appl. No.: 13/248,528

(22) Filed: Sep. 29, 2011

(65) Prior Publication Data

US 2012/0077516 A1    Mar. 29, 2012

Related U.S. Application Data

(60) Provisional application No. 61/387,502, filed on Sep. 29, 2010.

(51) Int. Cl.
*H04B 17/00* (2006.01)
*G01S 5/06* (2006.01)
*G01S 5/02* (2010.01)

(52) U.S. Cl.
CPC ........ *G01S 5/06* (2013.01); *G01S 5/0205* (2013.01)
USPC ....................................... 455/67.11; 455/343

(58) Field of Classification Search
USPC .................................................... 455/67.11
See application file for complete search history.

(56) References Cited

U.S. PATENT DOCUMENTS

| | | | |
|---|---|---|---|
| 3,150,372 A | 9/1964 | Groth, Jr. | |
| 3,659,085 A | 4/1972 | Potter et al. | |
| 4,728,959 A | 3/1988 | Maloney | |
| 4,814,751 A | 3/1989 | Hawkins | |
| 4,845,504 A | 7/1989 | Roberts et al. | |
| 4,891,650 A | 1/1990 | Sheffer | |
| 5,056,106 A | 10/1991 | Wang | |
| 5,218,618 A | 6/1993 | Sagey | |
| 5,317,323 A | 5/1994 | Kennedy et al. | |

(Continued)

FOREIGN PATENT DOCUMENTS

JP    06-347529    12/1994
WO    2006088472 A1    8/2006

OTHER PUBLICATIONS

Amir Leshem, Mati Wax, "Array Calibration in the Presence of Multipath," IEEE Transactions on Signal Processing, vol. 48, No. 1, pp. 53-59, Jan. 2000.

(Continued)

*Primary Examiner* — Ajibola Akinyemi
(74) *Attorney, Agent, or Firm* — Duane Morris LLP

(57) ABSTRACT

A signal is received from a mobile device as multiple data samples. The received signal includes a first component corresponding to a known reference signal and a second component corresponding to an unknown channel impairment or an unknown noise. A sequence of blocks is formed based on the received samples. The first component of the received signal corresponding to the reference signal is known to within a constant phase shift over each block. A plurality of function values are generated as a function of time, frequency, and phase, based on the received signal, corresponding to a plurality of times, a plurality of frequencies, and a plurality of phase sequences. A time, a frequency, and a phase sequence corresponding to an optimal value the function values are determined. The determined time is outputted as a time of arrival of the received signal.

20 Claims, 10 Drawing Sheets

(56) References Cited

U.S. PATENT DOCUMENTS

| | | |
|---|---|---|
| 5,327,144 A | 7/1994 | Stilp et al. |
| 5,365,544 A | 11/1994 | Schilling |
| 5,372,144 A | 12/1994 | Mortier et al. |
| 5,404,376 A | 4/1995 | Dent |
| 5,423,067 A | 6/1995 | Manabe |
| 5,465,289 A | 11/1995 | Kennedy |
| 5,506,863 A | 4/1996 | Meidan et al. |
| 5,506,864 A | 4/1996 | Schilling |
| 5,508,708 A | 4/1996 | Ghosh et al. |
| 5,512,908 A | 4/1996 | Herrick |
| 5,515,419 A | 5/1996 | Sheffer |
| 5,519,760 A | 5/1996 | Borkowski et al. |
| 5,559,864 A | 9/1996 | Kennedy |
| 5,592,180 A | 1/1997 | Yokev et al. |
| 5,608,410 A | 3/1997 | Stilp et al. |
| 5,614,914 A | 3/1997 | Bolgiano et al. |
| 5,675,344 A | 10/1997 | Tong et al. |
| 5,736,964 A | 4/1998 | Ghosh et al. |
| 5,815,538 A | 9/1998 | Grell et al. |
| 5,825,887 A | 10/1998 | Lennen |
| 5,870,029 A | 2/1999 | Otto et al. |
| 5,920,278 A | 7/1999 | Tyler et al. |
| 5,952,969 A | 9/1999 | Hagerman et al. |
| 5,959,580 A | 9/1999 | Maloney et al. |
| 5,960,341 A | 9/1999 | LeBlanc et al. |
| 5,973,643 A | 10/1999 | Hawkes et al. |
| 5,987,329 A | 11/1999 | Yost |
| 6,014,102 A | 1/2000 | Mitzlaff et al. |
| 6,047,192 A | 4/2000 | Maloney |
| 6,091,362 A | 7/2000 | Stilp |
| 6,097,336 A | 8/2000 | Stilp |
| 6,097,709 A | 8/2000 | Kuwabara |
| 6,097,959 A | 8/2000 | Yost |
| 6,101,178 A | 8/2000 | Beal |
| 6,108,555 A | 8/2000 | Maloney et al. |
| 6,108,558 A | 8/2000 | Vanderspool, II |
| 6,115,599 A | 9/2000 | Stilp |
| 6,115,605 A | 9/2000 | Siccardo et al. |
| 6,119,013 A | 9/2000 | Maloney et al. |
| 6,127,975 A | 10/2000 | Maloney |
| 6,144,711 A | 11/2000 | Raleigh et al. |
| 6,172,644 B1 | 1/2001 | Stilp |
| 6,184,829 B1 | 2/2001 | Stilp |
| 6,188,351 B1 | 2/2001 | Bloebaum |
| 6,191,738 B1 | 2/2001 | Pfeil et al. |
| 6,201,499 B1 | 3/2001 | Hawkes et al. |
| 6,201,803 B1 | 3/2001 | Munday et al. |
| 6,212,319 B1 | 4/2001 | Cayrefourcq |
| 6,233,459 B1 | 5/2001 | Sullivan et al. |
| 6,246,884 B1 | 6/2001 | Karmi et al. |
| 6,266,013 B1 | 7/2001 | Stilp et al. |
| 6,269,246 B1 | 7/2001 | Rao et al. |
| 6,281,834 B1 | 8/2001 | Stilp |
| 6,285,321 B1 | 9/2001 | Stilp et al. |
| 6,288,675 B1 | 9/2001 | Maloney |
| 6,288,676 B1 | 9/2001 | Maloney |
| 6,295,455 B1 | 9/2001 | Fischer et al. |
| 6,311,043 B1 | 10/2001 | Haardt et al. |
| 6,317,081 B1 | 11/2001 | Stilp |
| 6,317,604 B1 | 11/2001 | Kovach, Jr. et al. |
| 6,334,059 B1 | 12/2001 | Stilp et al. |
| 6,351,235 B1 | 2/2002 | Stilp |
| 6,366,241 B2 | 4/2002 | Pack |
| 6,388,618 B1 | 5/2002 | Stilp et al. |
| 6,393,294 B1 | 5/2002 | Perez-Breva et al. |
| 6,400,320 B1 | 6/2002 | Stilp et al. |
| 6,407,703 B1 | 6/2002 | Minter et al. |
| 6,449,486 B1 | 9/2002 | Rao |
| 6,463,290 B1 | 10/2002 | Stilp et al. |
| 6,470,195 B1 | 10/2002 | Meyer |
| 6,477,161 B1 | 11/2002 | Hudson |
| 6,483,460 B2 | 11/2002 | Stilp et al. |
| 6,492,944 B1 | 12/2002 | Stilp |
| 6,501,955 B1 | 12/2002 | Durrant et al. |
| 6,519,465 B2 | 2/2003 | Stilp et al. |
| 6,546,256 B1 | 4/2003 | Maloney |
| 6,553,322 B1 | 4/2003 | Ignagni |
| 6,563,460 B2 | 5/2003 | Stilp et al. |
| 6,571,082 B1 | 5/2003 | Rahman |
| 6,591,112 B1 | 7/2003 | Siccardo et al. |
| 6,603,428 B2 | 8/2003 | Stilp |
| 6,603,761 B1 | 8/2003 | Wang |
| 6,640,106 B2 | 10/2003 | Gutowski et al. |
| 6,646,604 B2 | 11/2003 | Anderson |
| 6,661,379 B2 | 12/2003 | Stilp et al. |
| 6,765,531 B2 | 7/2004 | Anderson |
| 6,771,625 B1 | 8/2004 | Beal |
| 6,771,969 B1 | 8/2004 | Chinoy |
| 6,782,264 B2 | 8/2004 | Anderson |
| 6,782,265 B2 | 8/2004 | Perez-Breva et al. |
| 6,834,234 B2 | 12/2004 | Scherzinger et al. |
| 6,839,539 B2 | 1/2005 | Durrant et al. |
| 6,845,240 B2 | 1/2005 | Carlson et al. |
| 6,859,172 B2 | 2/2005 | Powers et al. |
| 6,871,077 B2 | 3/2005 | Kennedy, Jr. |
| 6,873,290 B2 | 3/2005 | Anderson et al. |
| 6,876,859 B2 | 4/2005 | Anderson et al. |
| 6,920,329 B2 | 7/2005 | Kennedy, Jr. et al. |
| 6,922,170 B2 | 7/2005 | Alexander, Jr. |
| 6,944,465 B2 | 9/2005 | Spain et al. |
| 6,952,158 B2 | 10/2005 | Kennedy, Jr. |
| 6,987,979 B2 | 1/2006 | Carlsson |
| 6,996,392 B2 | 2/2006 | Anderson |
| 7,023,383 B2 | 4/2006 | Stilp et al. |
| 7,116,987 B2 | 10/2006 | Spain, Jr. et al. |
| 7,167,713 B2 | 1/2007 | Anderson |
| 7,167,714 B2 | 1/2007 | Dressler et al. |
| 7,233,799 B2 | 6/2007 | Spain, Jr. |
| 7,250,907 B2 | 7/2007 | Krumm et al. |
| 7,257,414 B2 | 8/2007 | Spain, Jr. et al. |
| 7,271,765 B2 | 9/2007 | Stilp et al. |
| 7,340,259 B2 | 3/2008 | Maloney |
| 7,383,051 B2 | 6/2008 | Spain, Jr. et al. |
| 7,427,952 B2 | 9/2008 | Bull et al. |
| 7,433,652 B2 | 10/2008 | Durgin |
| 7,433,695 B2 | 10/2008 | Gordon et al. |
| 7,440,762 B2 | 10/2008 | Maloney et al. |
| 7,460,505 B2 | 12/2008 | Spain |
| 7,593,738 B2 | 9/2009 | Anderson |
| 7,725,111 B2 | 5/2010 | Dressler et al. |
| 7,734,298 B2 | 6/2010 | Bhattacharya et al. |
| 7,753,278 B2 | 7/2010 | Spain, Jr. et al. |
| 7,796,966 B2 | 9/2010 | Bhattacharya et al. |
| 7,848,762 B2 | 12/2010 | Gordon et al. |
| 7,899,467 B2 | 3/2011 | Feuerstein et al. |
| 8,013,785 B2 | 9/2011 | Bhattacharya et al. |
| 8,068,802 B2 | 11/2011 | Bhattacharya et al. |
| 8,068,855 B2 | 11/2011 | Dressler et al. |
| 8,106,817 B2 | 1/2012 | Bhattacharya et al. |
| 8,106,818 B2 | 1/2012 | Bhattacharya et al. |
| 8,155,394 B2 | 4/2012 | Allegra et al. |
| 2002/0172223 A1 | 11/2002 | Stilp et al. |
| 2003/0064734 A1 | 4/2003 | Stilp et al. |
| 2003/0139188 A1 | 7/2003 | Chen et al. |
| 2003/0190919 A1 | 10/2003 | Niemenmaa |
| 2003/0203738 A1 | 10/2003 | Brown et al. |
| 2004/0043775 A1 | 3/2004 | Kennedy, Jr. et al. |
| 2004/0132466 A1 | 7/2004 | Kennedy, Jr. et al. |
| 2004/0203539 A1 | 10/2004 | Benes et al. |
| 2004/0203921 A1 | 10/2004 | Bromhead et al. |
| 2004/0218664 A1 | 11/2004 | Kennedy, Jr. et al. |
| 2004/0252752 A1 | 12/2004 | Kennedy, Jr. et al. |
| 2005/0058182 A1 | 3/2005 | Kennedy, Jr. et al. |
| 2005/0136945 A1 | 6/2005 | Kennedy, Jr. et al. |
| 2005/0164712 A1 | 7/2005 | Kennedy, Jr. et al. |
| 2005/0192026 A1 | 9/2005 | Carlson et al. |
| 2006/0003695 A1 | 1/2006 | Kennedy, Jr. et al. |
| 2006/0003775 A1 | 1/2006 | Bull et al. |
| 2006/0030333 A1 | 2/2006 | Ward et al. |
| 2006/0116130 A1 | 6/2006 | Kennedy, Jr. et al. |
| 2006/0125695 A1 | 6/2006 | Kennedy, Jr. et al. |
| 2006/0141998 A1 | 6/2006 | Kennedy, Jr. et al. |
| 2006/0154607 A1 | 7/2006 | Kennedy, Jr. et al. |
| 2006/0240836 A1 | 10/2006 | Kennedy, Jr. et al. |

(56) References Cited

U.S. PATENT DOCUMENTS

| | | |
|---|---|---|
| 2007/0087689 A1 | 4/2007 | Kennedy, Jr. et al. |
| 2007/0111746 A1 | 5/2007 | Anderson et al. |
| 2007/0155401 A1 | 7/2007 | Ward et al. |
| 2007/0155489 A1 | 7/2007 | Beckley et al. |
| 2007/0202885 A1 | 8/2007 | Kennedy, Jr. et al. |
| 2008/0132244 A1 | 6/2008 | Anderson et al. |
| 2008/0132247 A1 | 6/2008 | Anderson et al. |
| 2008/0137524 A1 | 6/2008 | Anderson et al. |
| 2008/0158059 A1 | 7/2008 | Bull et al. |
| 2008/0160952 A1 | 7/2008 | Bull et al. |
| 2008/0160953 A1 | 7/2008 | Mia et al. |
| 2008/0161015 A1 | 7/2008 | Maloney et al. |
| 2008/0248811 A1 | 10/2008 | Maloney et al. |
| 2008/0261611 A1 | 10/2008 | Mia et al. |
| 2008/0261612 A1 | 10/2008 | Mia et al. |
| 2008/0261613 A1 | 10/2008 | Anderson et al. |
| 2008/0261614 A1 | 10/2008 | Mia et al. |
| 2009/0005061 A1 | 1/2009 | Ward et al. |
| 2010/0117906 A1* | 5/2010 | Miller et al. ............ 342/387 |
| 2013/0022085 A1* | 1/2013 | Krasner ............ 375/142 |

OTHER PUBLICATIONS

Xin Wang, Zongxin Wang and Bob O'Dea, "A TOA-Based Location Algorithm Reducing the Errors Due to Non- Line-of-Sight (NLOS) Propagation," IEEE Trans. Vehicular Technology, vol. 52, No. 1, Jan. 2003, pp. 112-116.

M. Vanderveen, C. Papadias, A. Paulraj, "Joint Angle and Delay Estimation (JADE) for Multipath Signals Arriving at an Antenna Array," IEEE Communications Letters, vol. 1, No. 1, Jan. 1997, pp. 12-14.

R. Schmidt, "Multiple Emitter Location and Signal Parameter Estimation," IEEE Transactions on Antennas and Propagation, vol. AP-34, No. 3, Mar. 1986, pp. 276-280.

Y. Chen, M. Zoltowski, "Joint Angle and Delay Estimation for DS-CDMA with Application to Reduced Dimension Space-Time Rake Receivers," Mar. 1999, pp. 2933-2936.

A.J. Paulraj, C.B. Papadias, "Space-Time Processing for Wireless Communications", IEEE Signal Processing Magazine, vol. 11, Nov. 1997, pp. 49-83.

C.B. Papadias, A.J. Paulraj , "Space-Time Signal Processing for Wireless Communications: A Survey", Information Systems Laboratory, Stanford University.

M. Haardt, C. Brunner, J. Nossek, "Joint Estimation of 2-D Arrival Angles, Propagation Delays, and Doppler Frequencies in Wireless Communications," Proc. IEEE Digital Signal Processing Workshop, vol. 1, pp. 1-4, Bryce Canyon National Park, Utah, Aug. 1998.

Mati Wax, "Position Location from Sensors with Position Uncertainty," IEEE Transactions Aerospace and Electronic Systems, vol. AES-19, No. 5, Sep. 1983, pp. 658-662.

D.J. Torrieri, "Statistical Theory of Passive Location Systems", IEEE Transactions Aerospace and Electronic Systems, vol. AES-20, No. 2, Mar. 1984, pp. 183-198.

Y.T. Chan and K.C. Ho, "A Simple and Efficient Estimator for Hyperbolic Location", IEEE Transactions Signal Processing, vol. 42, No. 8, Aug. 1994, pp. 1905-1915.

W.H. Foy, "Position-Location Solutions by Taylor-Series Estimation", IEEE Transactions Aerospace and Electronic Systems, vol. AES-12, No. 2, Mar. 1976, pp. 187-194.

R.G. Stansfield, "Statistical Theory of DF Fixing", Journal IEE 94, Part III A, Oct. 1947, pp. 762-770.

M.P. Wylie and J. Holtzman, "The Non-Line of Sight Problem in Mobile Location Estimation", Process IEEE 5th International Conference on Universal Personal Communications, vol. 2, Oct. 1996, pp. 827-831.

L.Cong and W. Zhuang, "Non-Line-of-Sight Error Mitigation in TDOA Mobile Location", Process IEEE Global Telecommunications Conference, vol. 1, Sep. 2001, pp. 680-684.

P.C. Chen, "A Non-Line-of-Sight Error Mitigation Algorithm in Location Estimation", Process IEEE Conference on Wireless Communications Networking, vol. 1, 1999, pp. 316-320.

N.J. Thomas, D.G.M. Cruickshank and D.I. Laurenson, "Performance of a TDOA-AOA Hybrid Mobile Location System", 3G Mobile Communication Technologies, Conference Publication No. 477, Mar. 2001, pp. 216-220.

J. Caffery, Jr., and G. Stuber, "Subscriber Location in CDMA Cellular Networks," IEEE Transactions on Vehicular Technology, vol. 47, No. 2, May 1998, pp. 406-416.

J. Caffery. Jr., "A New Approach to the Geometry of TOA Location," IEEE, VTC 2000, pp. 1943-1949.

M.Silventoinen and T. Rantalainen, "Mobile Station Emergency Locating in GSM", Process IEEE International Conference, Personal Wireless Communications, vol. 1, 1996, pp. 232-238.

Y. Zhao, "Standardization of Mobile Phone Positioning for 3G Systems," IEEE Communications Magazine, Jul. 2002, pp. 108-116.

C. Drane, M. MacNaughtan, and C. Scott, "Positioning GSM Telephones," IEEE Communications Magazine, Apr. 1998, pp. 46-54, 59.

J. Caffery, Jr., and G. Stuber, "Overview of Radiolocation in CDMA Cellular Systems," IEEE Communications Magazine, Apr. 1998, pp. 38-45.

T. Rappaport, J.H. Reed and B.D. Woerner, "Position Location Using Wireless Communications on Highways of the Future," IEEE Communications Magazine, Oct. 1996, pp. 33-41.

I. Ziskind and M. Wax, "Maximum Likelihood Localization of Multiple Sources by Alternating Projection," IEEE Transactions on Acoustics, Speech, and Signal Porcessing, vol. 36, No. 10, pp. 1553-1560, Oct. 1988.

G.W.K. Colman, "A Comparison of the Accuracy of TDOA and TOA Location Algorithms with Equivalent Receiver Geometry," Defence R&D Canada Technical Memorandum (DREO TM 2001-063), Oct. 2001, pp. 1-53.

L. Mailaender, "On the Geolocation Bounds for Round-Trip Time-of-Arrival and All Non-Line-of-Sight Channels", EURASIP Journal on Advances in Signal Processing, vol. 2008, pp. 1-10.

N. Agarwal, L. Chaudran-Wadi, and V. Apte, "Capacity Analysis of the GSM Short Message Service", Indian Institute of Technology Bombay, www.cse.iitb.ac.in/~varsha/allpapers/wireless/ncc03cam.pdf, 2004, pp. 1-5.

J.D. Bard, and F.M. Ham, "Time Difference of Arrival Dilution of Precision and Applications," IEEE Transactions on Signal Processing, vol. 47, No. 2, pp. 521-523, Feb. 1999.

K.C. Ho, and W. Xu, "An Accurate Algebraic Solution for Moving Source Location Using TDOA and FDOA Measurements", IEEE Transactions on Signal Processing, vol. 52, No. 9, Sep. 2004, pp. 2453-2463.

C.H. Knapp and G.C. Carter, "The Generalized Correlation Method for Estimation of Time Delay," IEEE Transactions on Acoustics, Speech, and Signal Processing, vol. ASSP-24, No. 4, Aug. 1976, pp. 320-327.

M. Rahnema, "Overview of the GSM System and Protocol Architecture," IEEE Communications Magazine, Apr. 1993, pp. 92-100.

S. Stein, "Algorithms for Ambiguity Function Processing," IEEE Transactions on Acoustics, Speech, and Signal Processing, vol. ASSP-29, No. 3, Jun. 1981, pp. 588-599.

M. Vanderveen, C.B. Papadias, and A. Paulraj, "Joint Angle and Delay Estimation (JADE) for Multipath Signals Arriving at an Antenna Array", IEEE Communications Letters, vol. 1, No. 1, Jan. 1997, pp. 12-14.

M. Wax and I. Ziskind, "On Unique Localization of Multiple Sources by Passive Sensor Arrays," IEEE Transactions on Acoustics, Speech, and Signal Processing, vol. 37, No. 7, Jul. 1989, pp. 996-1000.

B. Yang, "Projection Approximation Subspace Tracking," IEEE Transactions on Signal Processing, vol. 43, No. 1, Jan. 1995, pp. 95-107.

Rick Roberts, "Project: IEEE P802.15 Working Group for Wireless Personal Area Networks (WPANS)," Harris Corporation, Melbourne Florida, Oct. 4, 2004, pp. 1-11.

Stephanie Bell, A Beginners Guide to Uncertainty of Measurement, The National Physics Laboratory of the United Kingdom of Great Britain and Northern Ireland, Teddington, Middlesex, UK, 2001, pp. 1-41.

* cited by examiner

SYSTEM AND METHOD FOR SUB-COHERENT INTEGRATION FOR GEO-LOCATION USING WEAK OR INTERMITTENT SIGNALS

PRIORITY CLAIM

This application claims priority under 35 U.S.C. §119(e) from U.S. Provisional Pat. Ser. No. 61/387,502 entitled "System and Method for Sub-Coherent Integration for Intermittent Signals" filed Sep. 29, 2010, the entirety of which is hereby incorporated by reference herein.

BACKGROUND

With the recent proliferation of wireless communication devices such as mobile phones, pagers, cellular radios, and others, techniques for locating such devices have gained prominence, e.g., for emergency management systems or other applications involving location awareness. Referring to FIG. 1, in known wireless geo-location applications such as Time of Arrival Ranging (TOA-Ranging) or Time Difference of Arrival (TDOA), signal Time-of-Arrival (TOA) measurement is performed at multiple measurement locations (sites) 110-1, 110-2, . . . , 110-$p$ (generally sites 110). At each of these sites, the signal transmitted by a mobile device 120 is processed to yield times of arrival (TOAs), which are used to obtain surfaces of position. Such surfaces include, but are not limited to, circles, ellipses and hyperbolae upon which the signal transmitter (mobile device 120) can be positioned. The equations of these surfaces are used to solve for the transmitter location. The starting point for such geo-location methods is to obtain reliable TOAs for the signals. These TOAs may have some bias, but if the bias is common to all sites, or if the bias can be eliminated using some other a priori information, the TOAs may be used to solve for the transmitter location.

A known technique for geolocation using an ambiguity function is described at Stein, S., "Algorithms for ambiguity function processing," IEEE Transactions on Acoustics, Speech, and Signal Processing," vol. ASSP-29, no. 3, June 1981. According to that technique, an unknown TOA $\tau$ at a given site 110, corresponding to a transmission from a mobile device 120, and a corresponding unknown signal doppler frequency $\omega$ are obtained by determining the arguments that maximize a specified ambiguity function $f$ that is a function of TOA and doppler frequency:

$$(\hat{\omega}, \hat{\tau}) = \underset{\omega, \tau}{\operatorname{argmax}}[f(\omega, \tau)], \quad (1)$$

The ambiguity function $f$ may be expressed as:

$$f(\omega, \tau) = \left| \sum_{n=1}^{M} s(n+\tau) * r(n) \exp(-jn\omega) \right|. \quad (2)$$

In equation (2), the sequence s(n) represents the received signal (the signal received at a site 110) and contains a replica of the signal of interest, usually channel impaired and corrupted by noise. The sequence r(n) represents the reference signal; it is the signal that was actually transmitted by the emitter (mobile device 120) and is either determined by some means or known a priori. The symbol "*" denotes complex conjugation, n is the sample index of the discrete-time signal, and M is a number of samples. In equation (2), all signal sequences are complex baseband representations, and this formulation assumes constant doppler and propagation uncertainty over the duration of the received signal. It is assumed that the baseband reference signal at all times can be either determined exactly or is known a priori.

SUMMARY

In an embodiment of the present disclosure, a signal is received from a mobile device as a plurality of data samples. The received signal includes a first component corresponding to a known reference signal and a second component corresponding to an unknown channel impairment, an unknown noise, or both. A sequence of blocks is formed based on the received samples, wherein the first component of the received signal corresponding to the reference signal is known to within a constant phase shift over each block. Forming the sequence of blocks based on the received samples may include forming a reference block and a non-reference block, wherein a phase value associated with the reference block in the determined phase sequence is known to be zero. In other words, the reference block may be considered as having phase=0, and the non-reference block (or non-reference blocks if there are more than one) is aligned to it. A first plurality of function values is generated as a function of time, frequency, and phase, based on the received signal, wherein the function values of the first plurality correspond to multiple times, multiple frequencies, and multiple phase sequences. A time, a frequency, and a phase sequence corresponding to an optimal value of the first plurality of function values are determined. The determined time is outputted as the time of arrival of the received signal. In another embodiment, a computer readable storage medium has instructions stored tangibly on it. When executed by a processor, the instructions cause the processor to perform the foregoing operations.

In an embodiment, a signal is received from a mobile device as a plurality of data samples. The received signal includes a first component corresponding to a known reference signal and a second component corresponding to at least one of an unknown channel impairment and an unknown noise. A sequence of blocks is formed based on the received samples. The sequence of blocks is divided into plural sets of blocks. For each set, the first component of the received signal corresponding to the reference signal is known to within a constant phase shift over each block in said set. For each set, a plurality of function values is generated as a function of time, frequency, and phase, based on the received signal, The function values of the plurality correspond to a plurality of times, a plurality of frequencies, and a first plurality of phase sequences. For each set, a time, a frequency, and a phase sequence associated with that set and corresponding to an optimal value of the first plurality of function values are determined. A time of arrival of the signal is determined based on the determined times associated with respective sets.

In an embodiment, a signal is received from a mobile device as a plurality of data samples. The received signal includes a first component corresponding to a known reference signal and a second component corresponding to at least one of an unknown channel impairment and an unknown noise. A sequence of blocks is formed based on the received samples. The first component of the received signal corresponding to the reference signal is known to within a constant phase shift over each block. For each block, a first plurality of function values is generated as a function of time and frequency, based on the received signal. The function values of the first plurality correspond to a plurality of times and to a plurality of frequencies. The sequence of blocks is sorted according to a predetermined metric. The sorted sequence of blocks is divided into plural sets of blocks, with the sets being ranked according to an order. At an initial processing stage $Z_0$, at least one candidate phase sequence is determined based on a function of time, frequency, and phase and based on an initial set $S_0$ among the sets of blocks. At each stage $Z_i$ of one or more subsequent processing stages corresponding to respective distinct sets other than said initial set $S_0$, at least one candidate phase sequence is determined based on the function of time, frequency, and phase, further based on a set $S_j$ corresponding to stage $Z_i$, and further based on the sets preceding set $S_j$, wherein an initial subsequence of each candidate phase sequence determined at stage $Z_i$ includes one of the candidate phase sequences determined at a stage $Z_{i-1}$ preceding stage $Z_i$. A time, a frequency, and a phase sequence that optimize the function of time, frequency, and phase are determined based on the candidate phase sequence(s) determined at a last (final) processing stage among the subsequent processing stages. The determined time is outputted as the time of arrival of the received signal.

BRIEF DESCRIPTION OF THE DRAWINGS

The following will be apparent from elements of the figures, which are provided for illustrative purposes and are not necessarily to scale.

DETAILED DESCRIPTION

Figure 1:
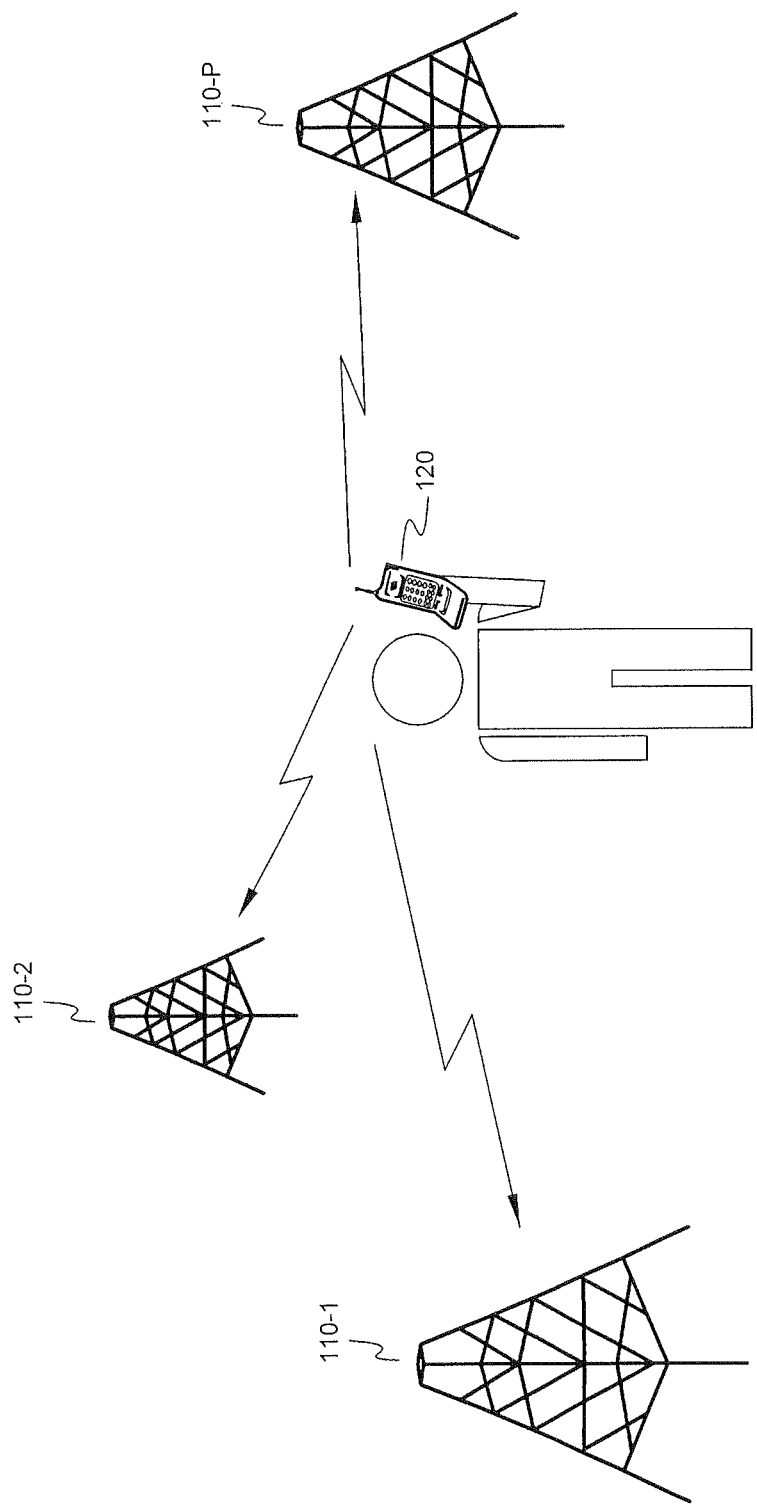
FIG. 1 is an illustration of a mobile device and measurement sites for geo-location of the mobile device.

This description of certain exemplary embodiments is intended to be read in connection with the accompanying drawings, which are to be considered part of the entire written description.

A problem with evaluating equation (2) above arises when there is a lack of continuity in the reference signal r(n). The sequence r(n) may not be known exactly due to a variety of reasons, and yet r(n) may be known in certain time intervals. For example, if the entire signal r(n) spans a time interval [0,T], it may be the case that in certain subintervals of this entire interval, e.g., subintervals $[0,t_1], [t_2,t_3], \ldots [t_{2(K-1)},T]$, the signal is known completely or at least to within an arbitrary or bounded phase shift.

Embodiments of the present disclosure address such a situation and produce a reliable estimate of the TOA when the transmitted signal has at least one of the following characteristics: (a) a low Signal to Noise Ratio (SNR) with limited coherence; (b) low SNR and an intermittent nature. A typical case of such characteristics arises when one is observing a far transmitter that either shuts on and off intermittently or is subject to signal fading or blockage that may render the signal unreliable during such fades. A known method of solving the type of problem detailed in (a) and (b) above is to non-coherently integrate the ambiguity functions. In the non-coherent integration (NCI) approach, the magnitude of each ambiguity function is computed, and the sum of such magnitudes is used to find the optimal pair $\hat{\omega},\hat{\tau}$. Embodiments of the present disclosure address the problem described above by employing a technique referred to as sub-coherent integration (SCI) that provides better performance than NCI.

The length of each time interval in which the transmitted signal is known, or at least known to within some unknown (but constant) phase shift of the signal, may be referred to as a "coherent length" of the signal. Thus, in the example above where there is a lack of continuity in the signal r(n), there are several such coherent lengths. In wireless air standards such as GSM, CDMA and UMTS/WCDMA, coherent length is limited by many factors, including intermittent transmission and carrier phase drift. For GSM, the maximum length of signal coherence is effectively the TDMA slot duration, as the transmissions are intermittent and no phase relationship can be assumed even between consecutive bursts. For UMTS, phase drift at the transmitter may limit the length of coherent integration to less than the optimal length required for detection. In low signal-to-noise (SNR) cases, there may not be enough integration gain within the coherent signal duration to reliably estimate the signal time-of-arrival. At the same time, due to the low SNR, it may be impossible to measure the phase using training or pilot sequences. At such low SNR measurement sites, it is likely that none of the coherently measured ambiguity results will yield a result that exceeds the detection threshold. Therefore, such a site may be unable to participate in location determination according to prior techniques.

Embodiments of the present disclosure circumvent the limit on the coherent length that occurs due to any of the factors mentioned above, increasing the coherent length to include multiple segments of the available signal. More generally, embodiments may use all segments of a signal that could potentially be used for TOA determination.

The received signal is assumed to have constant, unknown phase rotation over each of K blocks each having $M_k$ samples. The total number of samples available for processing is M. The specific values $M_k$ may be determined by the characteristics of the particular air standard or application and may be of equal size or of varying sizes. In one embodiment, each block includes m signal points (samples), and the received signal is known in each interval [1, m], [m+1, 2 m], ..., [M−m+1, M] except for a sequence of unknown phase shifts $\theta_1, \theta_2, \ldots \theta_K$ where these phase shifts apply to respective intervals. These phase shifts may be correlated, e.g., there may be a relationship between the phase shifts from one block to another; in such cases, the Sub-Coherent Integration (SCI) technique simplifies further, as the search space of possible phase shifts may be reduced based on such a relationship.

The coherent length may be increased by aligning each block as closely as possible to a common phase reference. In one embodiment, the phase reference may be taken as the phase of one of the blocks. The operation of the SCI detector may then be written as:

$$(\hat{\omega}, \hat{\tau}) = \underset{\omega,\tau,\Phi}{\mathrm{argmax}} |f(\omega, \tau, \Phi)|, \qquad (3)$$

in which the term within the magnitude sign may be written as a sum of phase rotated ambiguity functions as follows:

$$f(\omega, \tau, \Phi) = \exp(j\phi_1)\sum_{n=1}^{m} s_1(n+\tau)*r_1(n)\exp(-jn\omega) + \quad (4)$$

$$\exp(j\phi_2)\sum_{n=m+1}^{2m} s_2(n+\tau)*r_2(n)\exp(-jn\omega) +$$

$$\exp(j\phi_3)\sum_{n=2m+1}^{3m} s_3(n+\tau)*r_3(n)\exp(-jn\omega) + \ldots +$$

$$\exp(j\phi_K)\sum_{n=M-m+1}^{M} s_K(n+\tau)*r_K(n)\exp(-jn\omega),$$

where $\Phi$ denotes the phase sequence $[\phi_1, \phi_2, \ldots \phi_K]$. The sequence $\hat{\Phi}$ is the optimal sequence of applied phase rotations (phase shifts in the complex plane) that produces the optimum (e.g., maximum) magnitude of the sub-coherently integrated (summed) ambiguity function in equation (3). The processing in some embodiments may include determining the optimal sequence of phase rotations $\hat{\Phi}$, the optimal value of the time shift $\hat{\tau}$ and the optimal value of the frequency shift $\hat{\omega}$ such that the absolute value of the summation is optimized (e.g., maximized) relative to other values of $\tau$ or $\omega$. At such an optimal value (e.g., maximum), the value of $\tau$ is determined as the TOA. One of ordinary skill in the art understands that functions may be manipulated such that, e.g., a minimum rather than a maximum is determined.

Figure 2:
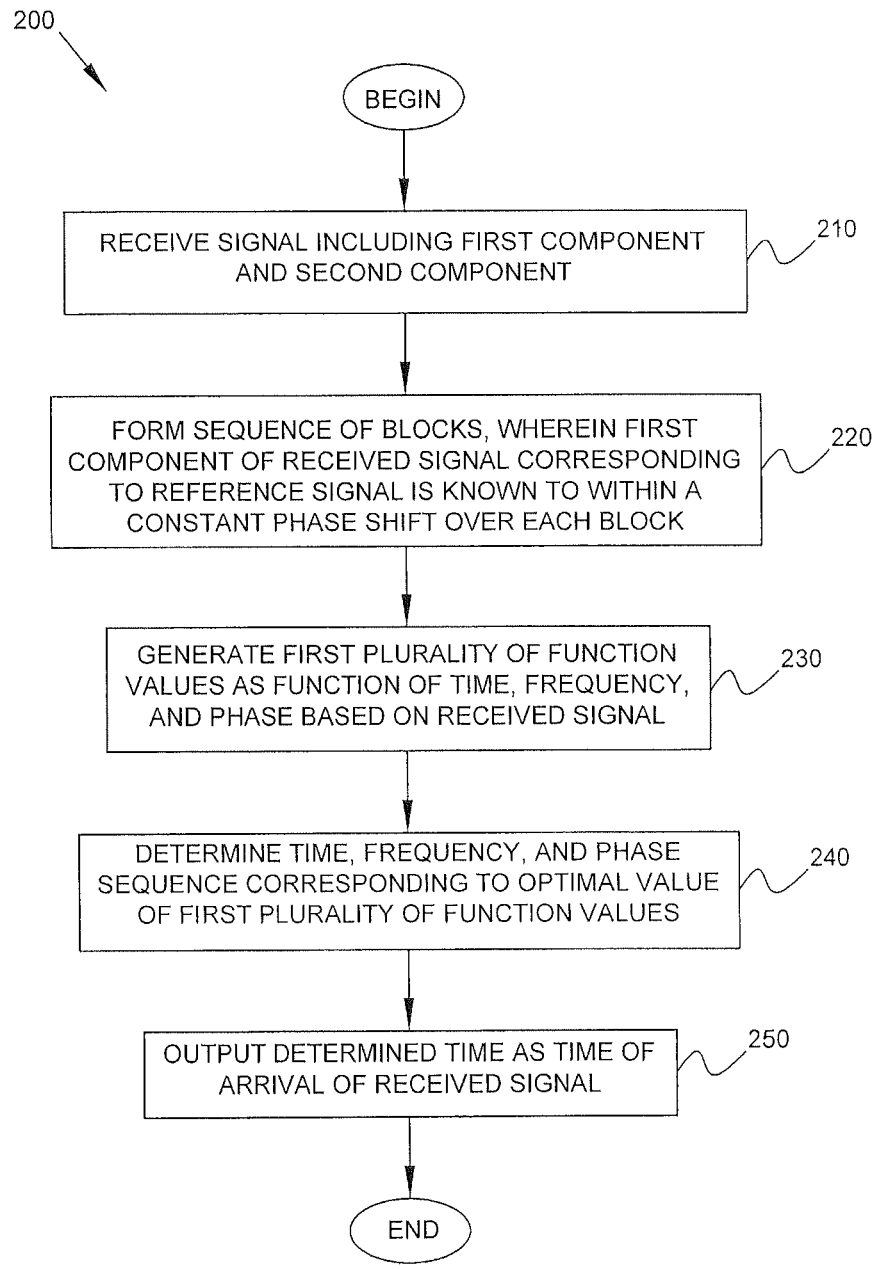
FIG. 2 is a flow diagram of a process in accordance with some embodiments.

Such processing may be represented graphically in a flow diagram as in FIG. 2. After a process 200 begins, a signal is received (210) from a mobile device as a plurality of data samples. The received signal includes a first component corresponding to a known reference signal and a second component corresponding to an unknown channel impairment, an unknown noise, or both. A sequence of blocks is formed (220) based on the received samples, wherein the first component of the received signal corresponding to the reference signal is known to within a constant phase shift over each block. A first plurality of function values is generated (230) as a function of time, frequency, and phase, based on the received signal, wherein the function values of the first plurality correspond to multiple times, multiple frequencies, and multiple phase sequences. A time, a frequency, and a phase sequence corresponding to an optimal value of the first plurality of function values are determined (240). Examples of search techniques for determining such an optimal value are discussed further below. The determined time is outputted (250) as the time of arrival of the received signal.

In the instance where there are a total of K+1 blocks available and one of the blocks is taken as a reference block, $\Phi$ may denote the sequence of phase rotations that align K of the blocks to the phase of the reference block. The objective function being maximized can then be written as:

$$f(\omega, \tau, \Phi) = \sum_{n=1}^{m} s_0(n+\tau)*r_0(n)\exp(-jn\omega) + \quad (5)$$

$$\exp(j\phi_1)\sum_{n=1}^{m} s_1(n+\tau)*r_1(n)\exp(-jn\omega) + \ldots$$

$$\exp(j\phi_3)\sum_{n=2m+1}^{3m} s_3(n+\tau)*r_3(n)\exp(-jn\omega) + \ldots +$$

$$\exp(j\phi_K)\sum_{n=M-m+1}^{M} s_K(n+\tau)*r_K(n)\exp(-jn\omega),$$

which is similar to equation (4) with the addition of an extra block (e.g., initial block zero) that is fixed in phase and does not contribute a variable component to the sequence $\Phi$. Alternatively, the first block in equation (5) may be regarded as a block that is rotated by zero, i.e., $\phi_0=0$, because a multiplier of exp(j0) corresponds to multiplication by unity.

In some embodiments, the sequence of phase shifts $\Phi$ may be determined by considering each term $\phi_i$ in the sequence as occupying one of L equally spaced points placed on the unit circle with indices 0, 1, ..., L−1. If the first point is placed on the real line (zero phase), the phases of the points may be $$0, \frac{2\pi}{L}, \frac{4\pi}{L}, \ldots \frac{2(L-1)\pi}{L}.$$

If a signal block is successively rotated by each of these L points, one of these rotations will place its phase within $$\frac{\pi}{L}$$

radians of the correct unknown phase. The SCI technique finds these optimal rotations of the signal blocks that result in an optimal (e.g., maximal or nearly maximal) ambiguity function. In other words, if there are K blocks, each block has L candidate phase rotations, and a search space of size $L^K$ may be analyzed to identify the best candidate. The value of L determines the resolution of the phase sequence. As L increases, the phase sequence approaches the full range of $\Phi$ in the limiting case so that each block may be aligned within an arbitrary tolerance. In some embodiments, a list of best candidates (e.g., a list of the N best candidates) may be identified rather than just the optimal rotation. Identifying a list of candidates may support multi-stage processing as described further below, as candidates may be pruned at each stage.

In terms of determining the TOA, the behavior of the ambiguity function in the vicinity of an optimum (e.g., maximum) is a consideration. Such behavior is primarily governed by the noise in the received signal. The efficacy of one embodiment of the present disclosure relates to this point: the noise, since it is effectively integrated coherently over the entire series of blocks, is dramatically reduced. Since noise is random, the summation of noise components over the entire length of M symbols is unaffected by the candidate phase rotations expressed by $\Phi$. That is, it is as if the noise terms were simply being added over M symbols. Thus, the TOA peak (the peak in $\tau$) may be identified.

To understand the behavior of the SCI detector, consider in one example that there are only two signal blocks of interest and that they are of the same length. Assume that each symbol of the signal has energy $E_s$. Also assume the additive noise on each symbol is Gaussian with zero mean and variance $\sigma^2$. Then the summation of the noise terms over each block results in random variables which are also zero mean Gaussian but with variance $E_s$ $$\sigma^2 \frac{M}{2}.$$

When τ is perfectly aligned, the summation of the signal terms results in terms $$\frac{ME_s}{2}$$

in each block. A simple approximation of the output in this case is:

$$Z_{SCI} = \frac{ME_s}{2}\exp(j\delta_1) + N_1 + \frac{ME_s}{2}\exp(j\delta_2) + N_2, \quad (6)$$

where $N_1$ and $N_2$ are zero mean Gaussian with variance $$E_s\sigma^2 \frac{M}{2},$$

and $\delta_1$ and $\delta_2$ are the deviations of the best selected discrete phase shift from the actual phase. Thus, both $\delta_1$ and $\delta_2$ are upper bounded by one half the angular spacing of the discrete set of phase shifts. Examining equation (6), it is observed that the signal component has an expected value of:

$$\left|\frac{ME_s}{2}(1+\exp(j\gamma))\right| \quad (7)$$

where γ in the worst case is equal to one half the spacing of the discrete phase shifts. That is, γ may be made as close to zero as desired by increasing the number of phase shifts. The noise component has zero mean and variance $E_s\sigma^2 M$. The magnitude of the noise is Rayleigh distributed with mean $$\frac{\pi}{2}\sigma\sqrt{E_s M}.$$

Now consider an alternative to the SCI detector where the terms in each block were noncoherently summed. In such a case, the output of the detector (a Non-Coherent Integrator, or NCI detector) would be:

$$Z_{NCI} = \left|\frac{ME_s}{2}\exp(j\delta_1) + N_1\right| + \left|\frac{ME_s}{2}\exp(j\delta_2) + N_2\right|, \quad (8)$$

which is equivalent to:

$$Z_{NCI} = \left|\frac{ME_s}{2} + N_1\right| + \left|\frac{ME_s}{2} + N_2\right|, \quad (9)$$

where the terms in $\delta_1$ and $\delta_2$ have been absorbed into the noise terms with no alteration of the noise statistics. While the signal terms of the two detectors are comparable (especially when the number of discrete phase shifts is large), the noise term of the NCI detector is the summed magnitude of two complex Gaussian random variables. That is, it is the sum of two independent Rayleigh random variables. The mean noise at the NCI output is the sum of the means of two Rayleigh random variables:

$$\frac{\pi}{2}\sigma\sqrt{\frac{E_s M}{2}} + \frac{\pi}{2}\sigma\sqrt{\frac{E_s M}{2}} = \pi\sigma\sqrt{\frac{E_s M}{2}}$$

That is, the mean noise amplitude $\sqrt{2}$ is times (equivalent to 3 dB in power) larger in the NCI case as in the SCI case. This is one reason why the SCI detector as in various embodiments of the present disclosure can determine a TOA in signal conditions where an NCI detector as in prior approaches fails. With B blocks, the noise in the NCI case is larger by a factor of $\sqrt{B}$. The signal amplitude with SCI is smaller, as noted from the non-zero value of γ, but this diminution in signal amplitude is more than compensated for by the reduction in the noise. Furthermore, it is clear that in the limit, as the number of discrete phase shifts increases, the performance of the SCI detector, when viewed in terms of the SNR at the optimum τ, approaches that of the perfectly coherent detector.

In one embodiment, a recursive technique may be used to generate the sequence ambiguity values (equations 4 and 5), such that the summations corresponding to the functions may be efficiently computed, which may greatly reduce computational complexity. Using a sequence of codes similar to gray codes, where each code is a sequence of symbols and adjacent codes differ at one position, computations may be simplified to only account for the addition or subtraction corresponding to the position that differs between the adjacent codes. In other words, the entire summation of equations 4 or 5 need not be evaluated, but rather only offsets (e.g., deltas) may be processed. Referring to the example of K blocks in equation (4) or K+1 blocks in equation (5), the values of each individual block summation (ambiguity function) may be pre-computed at each of a plurality of points in the (τ, ω) space. In other words, a known two-dimensional (2D) ambiguity function of time and frequency may be pre-computed at each point in the (τ, ω) space. Assuming L uniformly distributed phase rotations starting from zero as in the formulation above, the $L^K$ space can be mapped to an L-ary alphabet with each of the $L^K$ candidate sequences having a unique representation. The phase rotation to L-ary alphabet mapping may be expressed as:

$$2\pi L_i/L \rightarrow L_i\{L_i=0,1,2\ldots,L-1\}.$$

Equation (4) can be re-stated in terms of the set of all length K L-ary vectors {L}:

$$(\hat{\omega},\hat{\tau}) = \underset{\omega,\tau,\Phi}{\operatorname{argmax}}|f(\omega,\tau,\Phi)| = \quad (10)$$

$$\underset{\omega,\tau,\{L\}}{\arg\max}|f(\omega,\tau,\{L\})| = \underset{\omega,\tau,\{L\}}{\arg\max}\left|\sum_{i=1}^{K}\exp(j2\pi L_{ij}/L)A_i(\omega,\tau)\right|,$$

where {L} is the set of all K-length L-ary sequences, i=1 to K is the block number (e.g., K=48), J=0 to $L^K-1$ is the sequence number of the (L,K) code, $L_{ij}$ is the i-th L-ary symbol of the j-th sequence in the (L,K) code, and $A_i(\omega,\tau)$ is the two-dimensional (frequency, time) ambiguity function for the i-th block, which corresponds to a term $$\sum_{n=1}^{m} s(n+\tau) * r(n)\exp(-jn\omega).$$

The recursive sequence ambiguity generator may be initialized with a starting sequence value, which may be the sum of the ambiguity function for the K blocks. This represents a sequence of zeros ([0 0 0 0 ... 0]) in the L-ary alphabet. An (L,K) gray code having an index in the range [0, $L^K$−1] is then used to recursively step through {L}. One such coding example is shown in Table 1 below for selected sequences. Each sequence is of length K.

TABLE 1

Example coding sequence

| Sequence # | Code |
|---|---|
| 0 | [0 0 0 ... 0] |
| 1 | [0 0 0 ... 1] |
| 2 | [0 0 0 ... 2] |
| L | [0 0 0 ... L − 1] |
| L + 1 | [0 0 0 ... 1 L − 1] |
| L + 2 | [0 0 0 ... 1 L − 2] |
| ... | ... |
| $L^K$ − 2 | [L − 1 0 0 ... 0 L − 1] |
| $L^K$ − 1 | [L − 1 0 0 ... 0 0] |

At each point in the recursion, one block within the sequence is in transition (different from the corresponding position in a predecessor sequence). The ambiguity function value for the next sequence in the recursion is generated by performing an addition and/or subtraction relative to the values for the current sequence. The particular operations performed are determined by the block in transition and the alphabet values (symbols) between which that block is transitioning. For example, in generating sequence #1 from sequence #0, the K-th block is in transition (it transitions from 0 to 1). Therefore, the generator may subtract the unrotated values for block K (to obtain the summation over all blocks except the K-th block) and add the 2π/L rotated values for the same block. The composite delta (offset) may be pre-computed, e.g., at the onset of the recursion. There are LK such delta functions (because there are K blocks, and L possibilities per block), and the difference between any two consecutive sequences in the coding progression can be mapped to one of them.

The recursion relationship between sequence numbers J−1 and J may be expressed as:

$$f(\omega,\tau,J)=f(\omega,\tau,J-1)-\exp(2\pi*L_{i(j-1)}/L)A_i(\omega,\tau)+\exp(2\pi L_{ij}/L)A_i(\omega,\tau) \quad (11)$$

$$=\theta(\omega,\tau,J-1)+\Delta(L_{ij},L_{i(j-1)}), \quad (12)$$

where i=1 to K is the block in transition between sequence numbers J−1 and J, and $\Delta(L_{ij},L_{i(j-1)})$ maps to one of LK delta ambiguity values.

Figure 3:
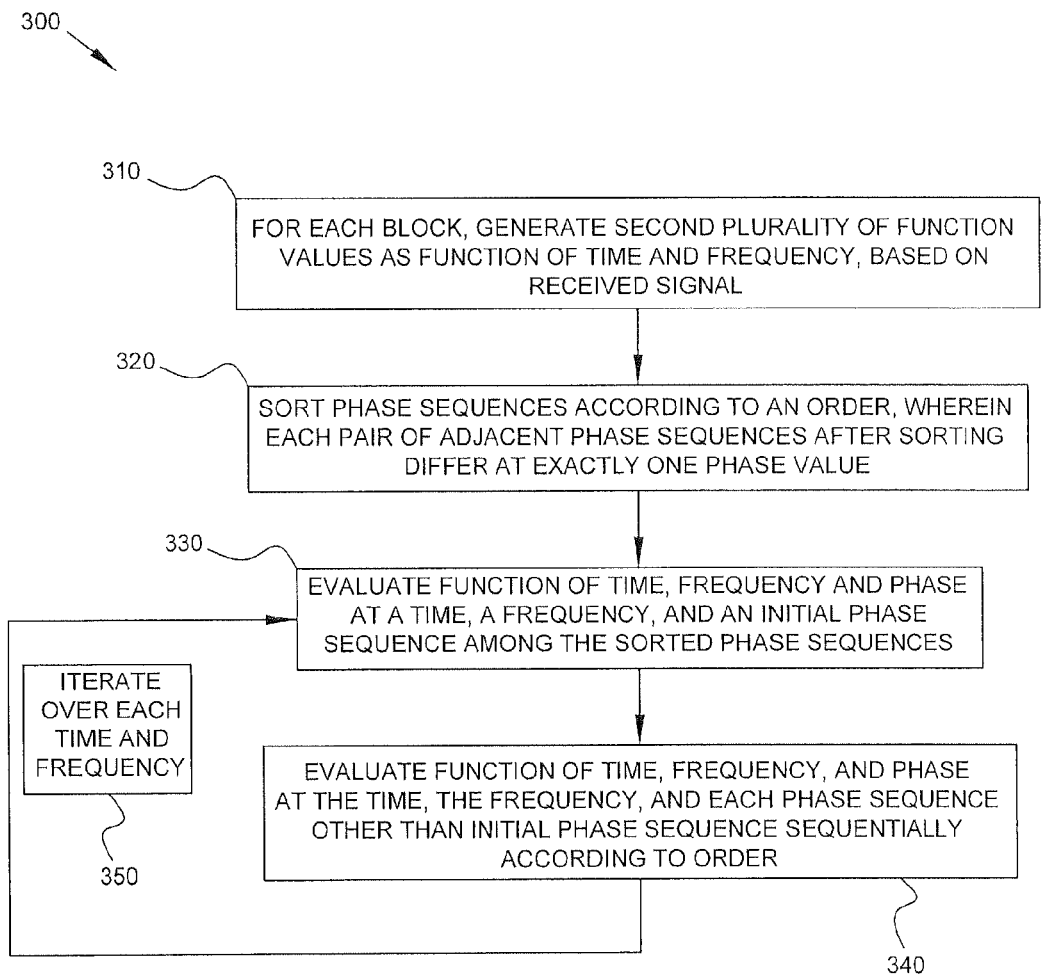
FIG. 3 is a flow diagram of processing associated with a recursive sequence ambiguity generator in accordance with some embodiments.

Processing associated with the recursive sequence ambiguity generator may be expressed graphically in the flow diagram of FIG. 3, which illustrates an example subprocess corresponding to 230 of FIG. 2 (generation of the first plurality of function values). For each block, a second plurality of function values (e.g., 2D ambiguity function) may be generated (310) as a function of time and frequency, based on the received signal. The function values of the second plurality may correspond to the times and frequencies discussed above in the context of FIG. 2. The phase sequences described in the context of FIG. 2 may be sorted (320) into a sequence of phase sequences according to an order, in which each pair of adjacent phase sequences in the sequence of phase sequences differ at exactly one phase value and are equal to one another at the other phase values. Table 1 may show an example of such an order.

For each time and frequency (iteration 350 over times and frequencies), the following processing may be performed. The function of time, frequency, and phase may be evaluated (330) at that time and frequency and at an initial phase sequence in the sequence of phase sequences (e.g., the first listed sequence in Table 1). Then, the function of time, frequency, and phase may be evaluated (340) at that time, that frequency, and each phase sequence other than the initial phase sequence sequentially according to the order. Such evaluation may proceed by adjusting a value of the three-dimensional (3D) ambiguity function of time, frequency, and phase at that time, that frequency, and a predecessor phase sequence (e.g., $\eta(\omega,\tau,J-1)$) with a term (e.g., $\Delta(L_{ij},L_{i(j-1)})$), dependent on the function value in the second plurality corresponding to that time, that frequency, and the block associated with the phase values that differ between that phase sequence and the predecessor phase sequence.

In one embodiment, the L-ary code space may initially be partitioned into a number of disjoint subsets. Each of these subsets has the property that it contains a representative member that is within a fixed distance (e.g., Hamming or Euclidean distance) of every other member in terms of the L-ary code space. Thus, every other member of the set is likely to have sequence ambiguity values that are in close proximity to that of the representative member. The size of the search space for determining optimality may then be reduced, e.g., by considering only the representative member of each subset.

In some embodiments, the Hamming and Euclidean distance measures determine the closeness of the ambiguity function values. The Hamming distance refers to the number of components (positions) at which two vectors differ, and the Euclidean distance refers to the scalar magnitude of the difference vector.

The recursive sequence generator may be applied to just the representative member of each set. From this, a number of candidate sets may be obtained that can be further searched exhaustively. Various techniques of generating these subsets are available. Using one specific example for the case where K=3 and L=4, the initial size 64 code space may be partitioned with Hamming distance 1 and Euclidean distance 1 as follows. Based on principles of group theory, the code space may be represented as a closed group under modulo-4 addition, and an order 16 subgroup not containing the members {100, 010, 001} (i.e., a Kronecker sequence for the K blocks) may be determined.

The subset {000, 002, 020, 022, 200, 202, 220, 222, 333, 331, 313, 311, 133, 131, 113, 111} qualifies as such a subgroup of order 16. Various methods are available for generating this type of subgroup, as is known to one of ordinary skill.

By adding {100, 010, 001} to every member of the subgroup, the other 48 members of the code space may be generated, as shown in Table 2 below.

TABLE 2

Code space partition with representative
column 1 and other columns

| Set # | Column 1 | Column 2 | Column 3 | Column 4 |
|---|---|---|---|---|
| 1 | 000 | 001 | 010 | 100 |
| 2 | 002 | 003 | 012 | 102 |
| 3 | 020 | 021 | 030 | 120 |
| 4 | 022 | 023 | 032 | 122 |
| 5 | 200 | 201 | 210 | 300 |
| 6 | 202 | 203 | 212 | 302 |
| 7 | 220 | 221 | 230 | 320 |
| 8 | 222 | 223 | 232 | 322 |
| 9 | 333 | 330 | 303 | 033 |
| 10 | 331 | 332 | 301 | 031 |
| 11 | 313 | 310 | 323 | 013 |
| 12 | 311 | 312 | 321 | 011 |
| 13 | 133 | 130 | 103 | 233 |
| 14 | 131 | 132 | 101 | 231 |
| 15 | 113 | 110 | 123 | 213 |
| 16 | 111 | 112 | 121 | 211 |

Column 1 in Table 2 represents the initial subgroup. Thus, the initial size-64 code space has been partitioned into 16 sets of 4 where the set members in columns in 2 to 4 of each row are within Hamming and Euclidean distance 1 of the corresponding element in column 1. Column 1 comprises a set of representative set members; in some embodiments, only column 1 is searched to determine optimality for ambiguity function values. This partitioning guarantees that during the sequence search of every 3-block grouping, at some point, two blocks will be in the optimal L-ary alignment and the third will be within $\pi/L$ radians.

Figure 4:
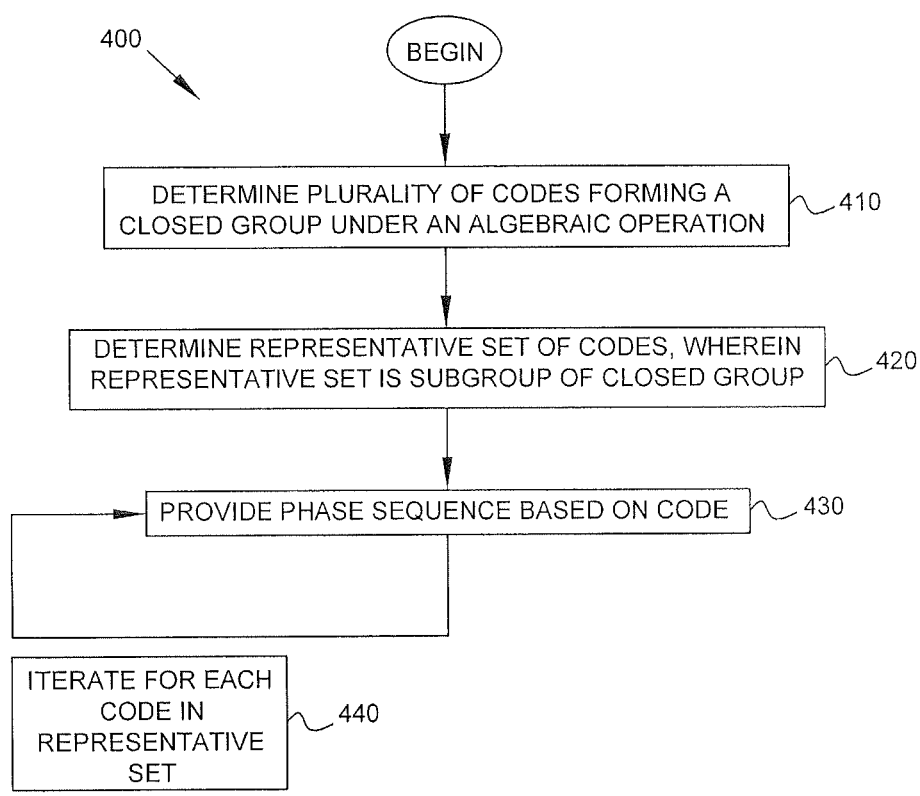
FIG. 4 is a flow diagram of a process of partitioning a code space in accordance with some embodiments.

Processing associated with such code space partitioning may be expressed graphically in the flow diagram of FIG. 4. Each phase sequence in the plurality of phase sequences described in the context of FIG. 2 may be a sequence of phase values associated with respective blocks, and the sequence of blocks may include K (e.g., K=3) blocks. The phase values of each phase sequence may each be expressible as $2\pi k/L$, where L is an integer, and k is an integer greater than or equal to 0 and less than or equal to L−1. After process 400 begins, a plurality of codes are determined (410), with each code having K symbols, one symbol corresponding to each block, each symbol being mappable to a value between 0 and L−1, and the plurality of codes forming a closed group under an algebraic operation (e.g., addition modulo 4). One of ordinary skill in the art understands that a group in mathematical terminology is an algebraic structure consisting of a set together with an operation that combines any two of its elements to form a third element in the group. To qualify as a group, the set and the operation must satisfy certain conditions called group axioms, namely closure (hence the terminology "closed group" above), associativity, identity, and invertibility. A representative set of codes in the plurality of codes is determined (420). The representative set may be a subgroup of the closed group. For each code in the representative set (shown as iteration 440), a phase sequence is provided (430) based on that code, where each phase value of said phase sequence is assigned as $2\pi p/L$, and p is a symbol of that code corresponding to the block associated with that phase value. As a result of such iteration 440, the plurality of phase sequences described in the context of FIG. 2 is provided.

The scale of the partition may be increased by using more blocks subject to certain restrictions on the relationship between the order of subgroups and that of the group from which they are derived. In some embodiments, the scale of the partition may be increased by concatenating smaller partitions. For example; 15 blocks may be broken into 5 groups of 3 blocks each, and the partition of Table 2 may be applied to each group of 3 blocks. This effectively partitions the $4^{15}$ code space into $16^5$ sets of cardinality 1024 with a maximum Hamming and Euclidean distance of 5 from the central (representative) element within each set. This partition allows a search to coarsely traverse the code space with a guarantee of arriving within a known minimum distance of every vector in the space.

For the 15 block example above, the code space partitioning may be combined with the recursive sequence generator, e.g., by applying a five symbol hexadecimal (16,5) code where each hexadecimal symbol represents a 3-block sequence of rotations from column 1 in Table 2.

A search through a concatenation of partitioned 3-block code spaces may be expressed as:

$$\arg\max_{\omega,\tau,\{_3^{16}L\}^5} |f(\omega, \tau, \{_3^{16}L\}^5)| = \quad (13)$$

$$\arg\max_{\omega,\tau,\{_3^{16}L\}^5} \left| \sum_{j=1}^{(K/3)} \sum_{i=1}^{3} \exp(j2\pi L_{ijk}/L) A_{ik}(\omega, \tau) \right|$$

where $\{_3^{16}L\}^5$ represents the L-ary code space comprising a concatenation of 5 groups of 3 blocks, with each block drawn from the representative set of a $\{_3^{16}L\}$ partition as in Table 2; $L_{ijk}$ is the i-th L-ary symbol of the k-th group of 3 blocks in the j-th sequence of the (16,5) gray code; and K is the total number of blocks (e.g., 15).

The hexadecimal gray code progression gives rise to 80 (i.e., 16 times 5) delta ambiguity functions which may be pre-computed. The 3 block grouping to hexadecimal symbol mapping may be taken directly from column 1 in Table 2, as shown by Table 3 below.

TABLE 3

Mapping of 3 block groupings to hexadecimal symbols

| Three-block group | Hexadecimal symbol |
|---|---|
| 000 | 0 |
| 002 | 1 |
| 020 | 2 |
| 022 | 3 |
| 200 | 4 |
| 202 | 5 |
| 220 | 6 |
| 222 | 7 |
| 333 | 8 |
| 331 | 9 |
| 313 | A |
| 311 | B |
| 133 | C |
| 131 | D |
| 113 | E |
| 111 | F |

The recursion between sequence numbers J−1 and J may be expressed as:

$$f(\omega, \tau, J) = f(\omega, \tau, J-1) + \quad (14)$$

$$\sum_{i=1}^{3} (\exp(2\pi * L_{ijk}/L) A_{ik}(\omega, \tau) - \exp(2\pi L_{i(j-1)k}/L) A_{ik}(\omega, \tau))$$

where k is the particular 3 block group in transition, and J is the sequence number.

After the initial search, a finer search of the most likely candidate sets may be performed using the recursive sequence generator. For this fine search, each group of 3 blocks may start from a representative member in column 1. A (4,5) gray code may be used to search along the corresponding rows in Table 2. The starting point for the fine search is the coarse result, i.e., the result from the search of the representative set members. For example, suppose a coarse (16,5) sequence search returns sequence number 655027 as the sequence that maximizes equation (12) for a pair $(\hat{\omega},\hat{\tau})$. This translates to [9 6 F D 8] in one example of hexadecimal code.

The $4^K$ recursion for the fine search may be defined by mapping each hexadecimal symbol to the appropriate row in Table 2. The columns of the corresponding rows in Table 2 are mapped to a quaternary (4-ary) alphabet. The resulting quaternary symbol mapping for each 3-block grouping is shown in Table 4 for the example coarse sequence number 655027 described above.

TABLE 4

Mapping of hexadecimal symbols to for refined search

| Macro-Block # | 1 | 2 | 3 | 4 | 5 |
|---|---|---|---|---|---|
| Coarse hex symbol | 9 | 6 | F | D | 8 |
| Quaternary Symbol | | | | | |
| 0 | 331 | 220 | 111 | 131 | 333 |
| 1 | 332 | 221 | 112 | 132 | 330 |
| 2 | 301 | 230 | 121 | 101 | 303 |
| 3 | 031 | 320 | 211 | 231 | 033 |

This format gives rise to 4K delta ambiguity functions that may be pre-computed.

In some embodiments, a multi-stage partition process is used, and the representative set is partitioned. An example for the specific case of Table 2 is shown in Table 5 for Hamming distance 1 and Euclidean distance 2.

TABLE 5

Example partitioning of representative set

| Set # | 1 | 2 | 3 | 4 |
|---|---|---|---|---|
| 1 | 000 | 002 | 020 | 200 |
| 2 | 222 | 220 | 202 | 022 |
| 3 | 333 | 331 | 313 | 133 |
| 4 | 111 | 113 | 131 | 311 |

Figure 5:
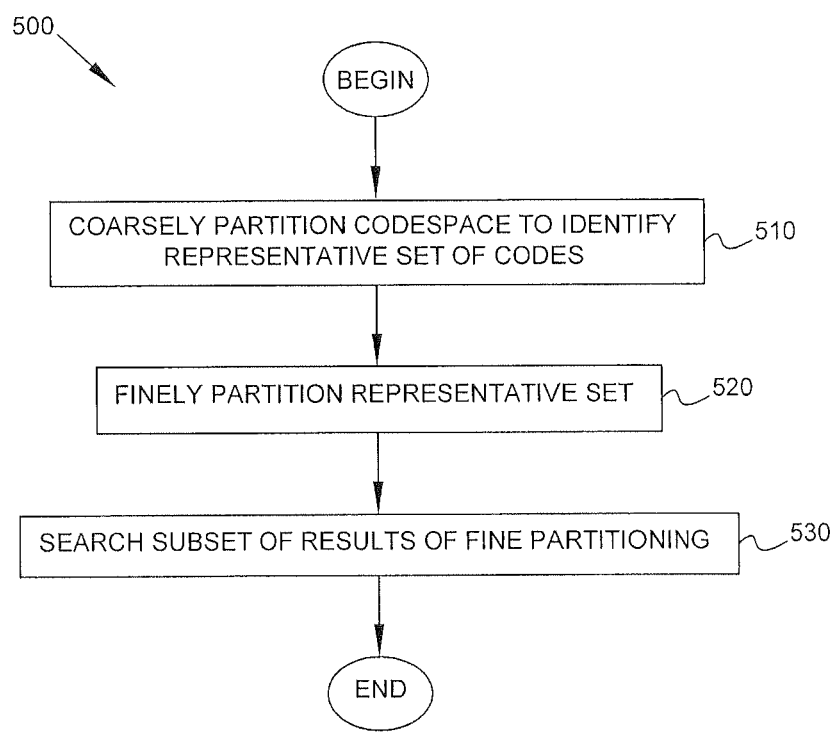
FIG. 5 is a flow diagram of a process of successive refinement of partitioning of a code space in accordance with some embodiments.

Thus, a three-step search process may be used to determine the final result. Referring to FIG. 5, a coarse partitioning of the code space (510) may identify a representative set of codes such as column 1 of Table 2. The representative set may itself be partitioned (520), and a subset of the results of the fine partitioning (e.g., column 1 of Table 5) may then be searched to determine optimal value(s).

In some embodiments, the optimal phase sequence may be obtained in an incremental manner in a multi-stage processing technique. Given K blocks sorted according to predetermined criteria (e.g., signal quality), the SCI technique (e.g., as in process 200) is applied to the first $k_1$ blocks in a first stage, e.g., using the recursion and/or partition techniques described above. A number of length $k_1$ candidate sequences are thus obtained. Assume $N_1$ candidate sequences of length $k_1$ are returned by the first processing stage. In a second stage, the SCI technique is applied $N_1$ times to the first $k_1+k_2$ blocks, with the blocks having index 1 through $k_1$ initialized to the candidates from the previous stage and kept static during the second stage. Only the additional $k_2$ blocks being added undergo the phase sequence search at this second stage. The recursion and/or partition techniques may again be applied. The second stage is thus used to extend and verify the results of the first stage. For each of the $N_1$ sequences from the first stage, up to $N_2$ candidates may be returned. This process is repeated until a sequence of length K is reached. The process may terminate early if any determined phase sequence exceeds an overall (e.g., global) detection threshold. At each stage, the best candidate sequence(s) have to meet certain criteria to remain viable candidates for the next stage. These criteria may include a quality metric threshold for that stage and proximity to a sequence passed in from the first stage, e.g., to ensure that the search does not drift inordinately. Sequences that do not meet these criteria may be discarded.

Figure 6A:
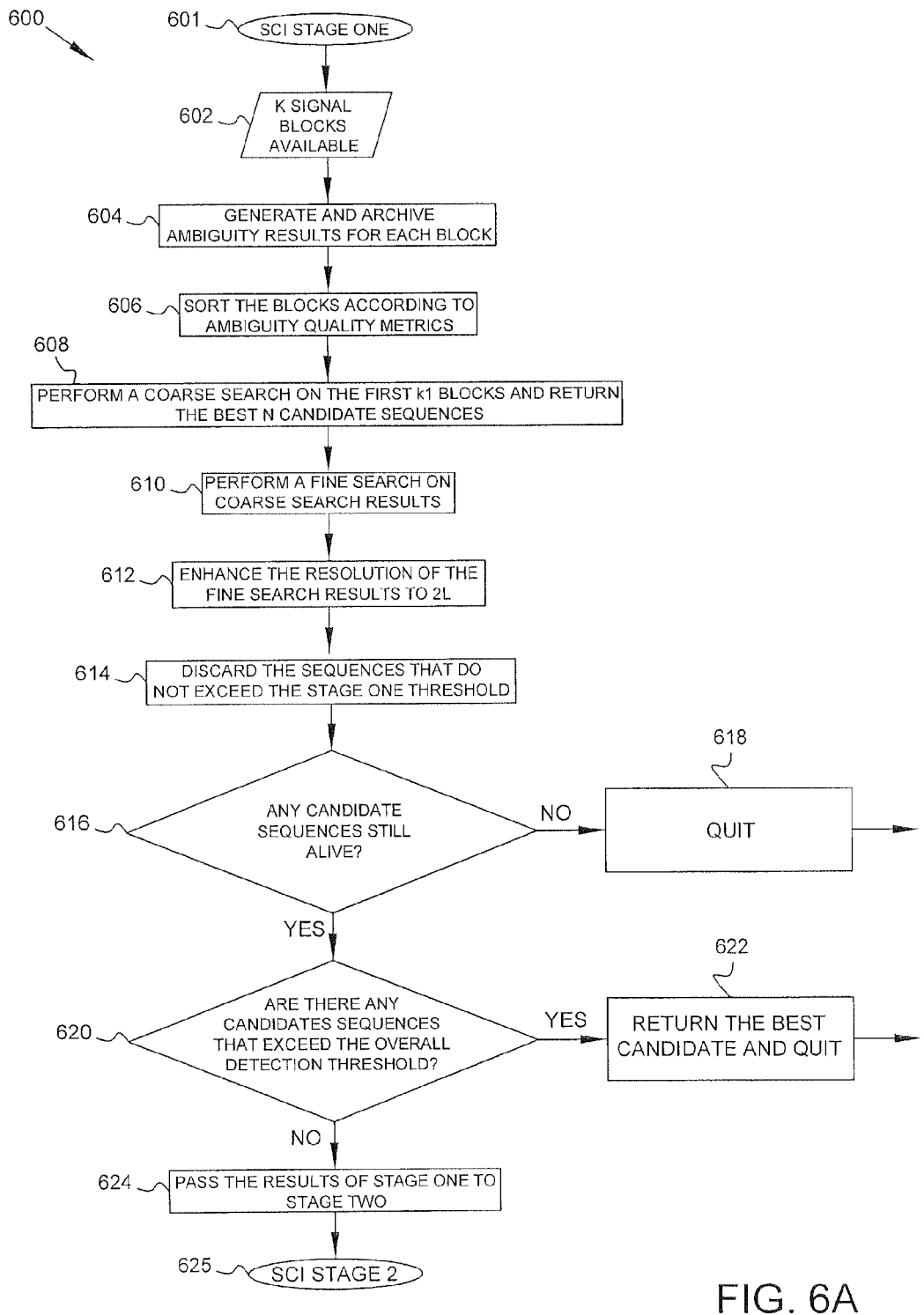
FIGS. 6A-6B are flow diagrams of multi-stage processing in accordance with some embodiments.
Figure 6B:
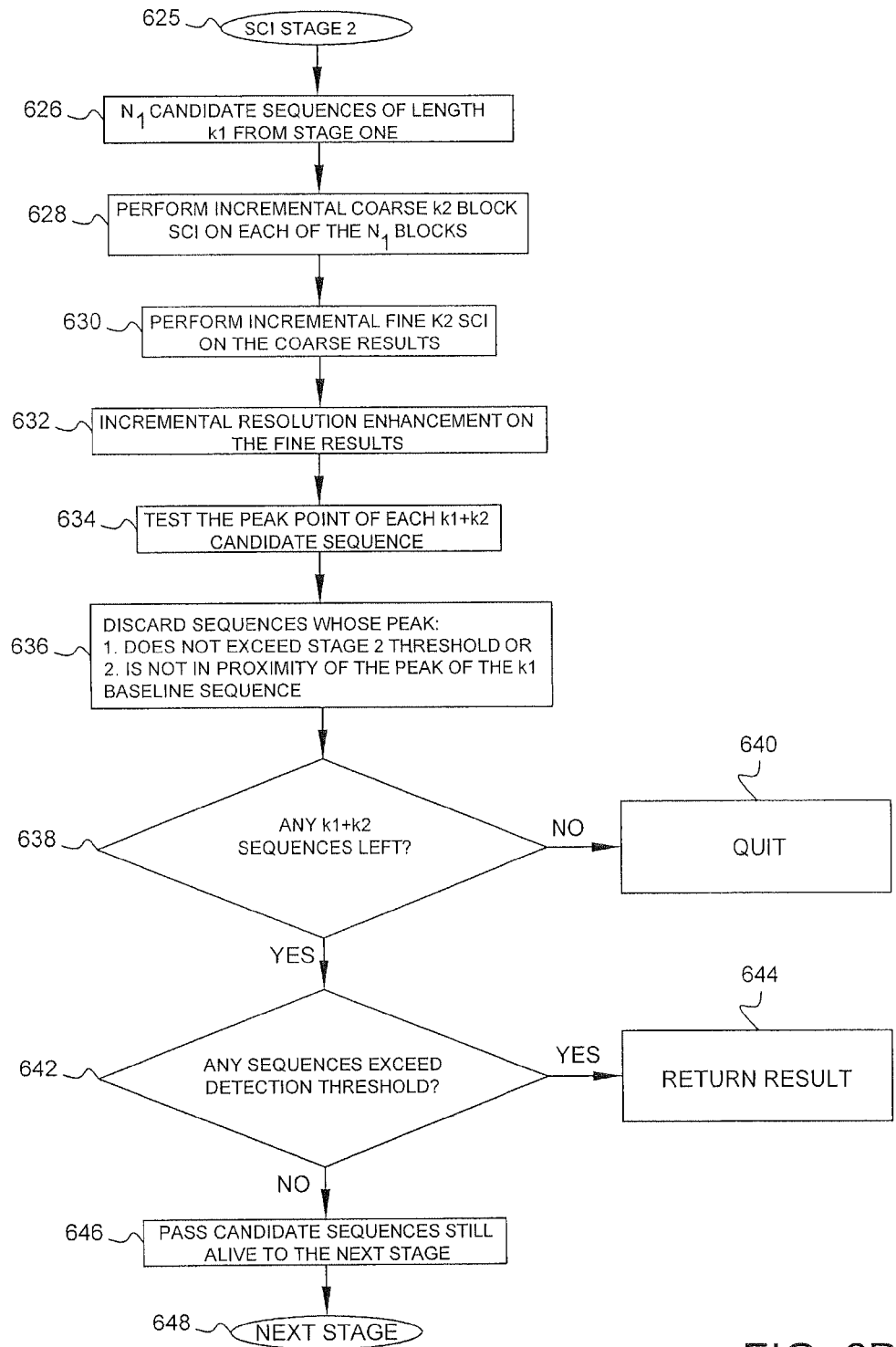

FIGS. 6A-6B are flow diagrams of sub-coherent integration (SCI) multi-stage processing in accordance with some embodiments. FIG. 6A shows processing at a first stage, and FIG. 6B shows processing at a second stage. Additional stages may proceed in similar fashion. Referring to FIG. 6A, after a first stage of processing begins (601), K signal blocks are identified (602). An ambiguity result (e.g., a two-dimensional ambiguity result that is a function of time and frequency) is generated and archived for each block (604). The blocks are sorted (606) according to ambiguity quality metrics. A coarse search (608) is performed on the first $k_1$ blocks, and the best N candidate sequences are returned, where N may be an integer greater than or equal to one. A fine search (610) may optimally be performed on the coarse search results. The resolution of the fine search results may optionally be enhanced (612), e.g., to 2L. The candidate phase sequences that do not exceed a stage one threshold may be discarded (614), i.e., the candidate phase sequences may be filtered based on that threshold. If no candidate phase sequences survive that filter (616), processing may terminate (618). If any candidate phase sequences remain, a test may be performed to determine if any candidate phase sequences exceed an overall detection threshold (e.g., a global threshold). If so, that is an indication that there are already some search results that are sufficiently good to stop at this point. In that case, the best candidate (or in some embodiments, the best candidates) may be returned, and processing may terminate (622). If the overall detection threshold is not exceeded by any candidate phase sequences, additional processing stages may be employed, and the results of stage one processing (remaining candidate phase sequences) are passed to stage two (624).

After stage two begins (625), $N_1$ candidate phase sequences each of length $k_1$ are identified as results from stage one. Incremental coarse SCI processing is performed using the next $k_2$ blocks, for each of the blocks of the $N_1$ candidate phase sequences. For example, suppose there are 48 blocks total, and there are three processing stages, corresponding to the first 16 blocks, the next 16 blocks (blocks 17-32), and the last 16 blocks (blocks 33-48). Suppose $N_1=10$, i.e., ten candidate phase sequences CS1, . . . , CS10 were identified during the first stage. At the second stage, SCI is performed using 32 blocks, namely, the 16 blocks from each of the 10 candidate sequences (which are held constant in terms of phase rotation) and blocks 17 through 32 (for which the phase rotations are variable and are searched).

Incremental fine SCI is performed (630) on the coarse results for the 32 blocks (with the first 16 held constant in phase). Incremental resolution enhancement is performed (632) on the fine search results. The 3D ambiguity function is evaluated for optimality using each such candidate sequence. Any phase sequences which do not exceed a stage two threshold or are not in proximity of the peak of the length $k_1$ baseline sequence may be discarded (636). In this context, the "peak"

of a sequence refers to the $(\hat{\omega},\hat{\tau})$ point that corresponds to an optimal function value, which optimal value is used to calculate the metric to test against thresholds. In some embodiments, only the peak point for each sequence is tested to determine if the sequence is viable. As discussed herein, references to sequences exceeding thresholds actually refer to one point in the $(\omega,\tau)$ space (or equivalently, $(\tau,\omega)$ space), for that sequence, which may be the point corresponding to an optimal (e.g., maximal) sequence ambiguity function value. If no candidate sequences of length $k_1+k_2$ remain (638), processing may terminate (640). Otherwise, if any sequences exceed the overall detection threshold (642), such a result may be returned (644). If no sequences exceed the overall detection threshold, the remaining candidate sequences may be passed (646) to the next stage for additional processing (648).

Figure 7:
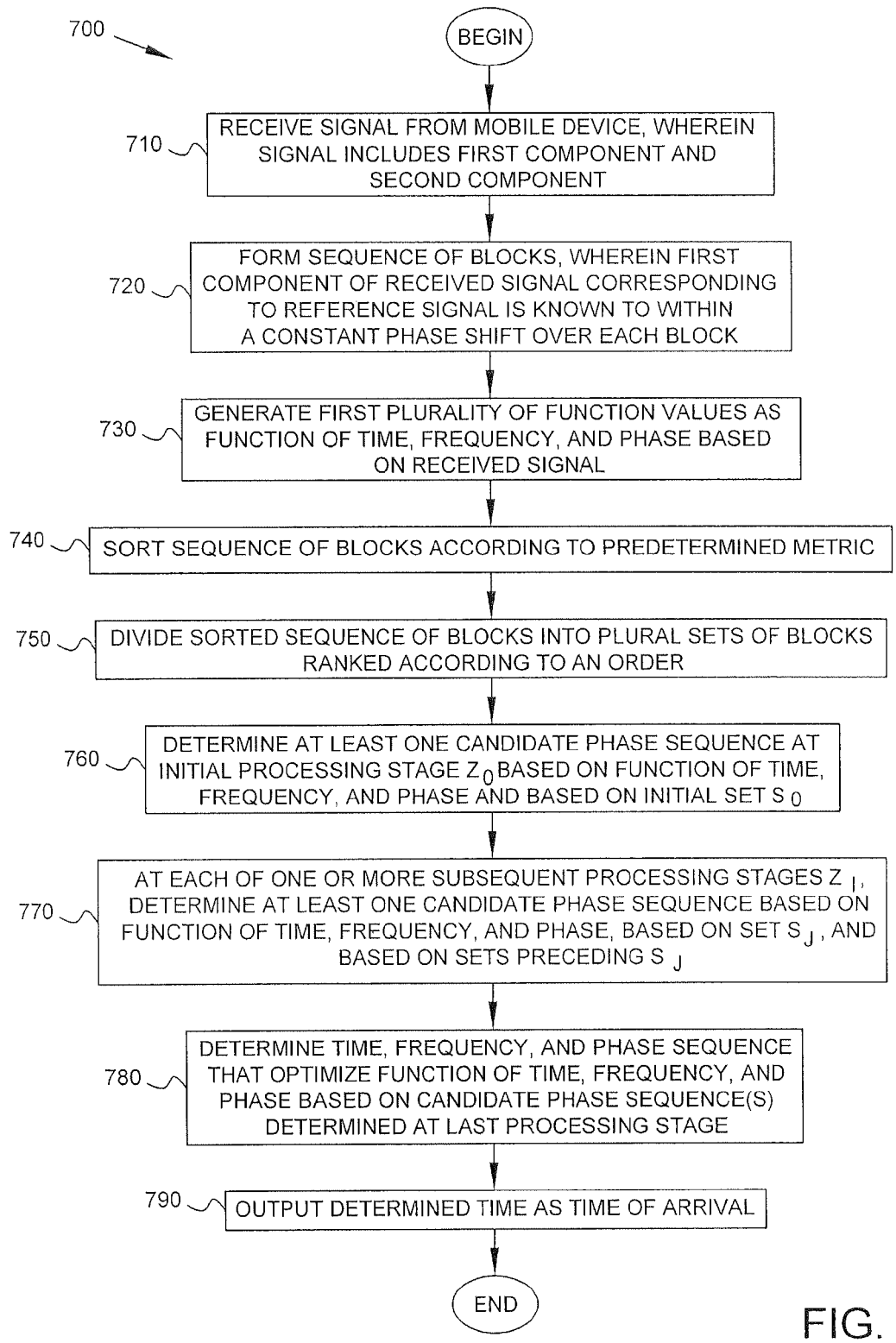
FIG. 7 is a flow diagram of a process of multi-stage sub-coherent integration (SCI) in accordance with some embodiments.

FIG. 7 is a flow diagram of a process of multi-stage SCI in accordance with some embodiments. After process 700 begins, a signal is received (710) from a mobile device as a plurality of data samples. The received signal includes a first component corresponding to a known reference signal and a second component corresponding to at least one of an unknown channel impairment and an unknown noise. A sequence of blocks is formed (720) based on the received samples. The first component of the received signal corresponding to the reference signal is known to within a constant phase shift over each block. For each block, a first plurality of function values (e.g., 2D ambiguity function values) is generated (730) as a function of time and frequency, based on the received signal. The function values of the first plurality correspond to a plurality of times and to a plurality of frequencies. The sequence of blocks is sorted (740) according to a predetermined metric. The sorted sequence of blocks is divided (750) into plural sets of blocks, with the sets being ranked according to an order. For example, the sets may be ranked based on time ordering (e.g., first 16 blocks temporally are assigned to the first set, next 16 blocks are assigned to the next set, etc.) or signal quality (e.g., highest 16 blocks based on SNR are assigned to first set).

At an initial processing stage $Z_0$, at least one candidate phase sequence is determined (760) based on a function of time, frequency, and phase and based on an initial set $S_0$ among the sets of blocks. For example, $S_o$ may include the first 16 blocks out of a total of 48 blocks. At each stage $Z_i$ of one or more subsequent processing stages corresponding to respective distinct sets other than said initial set $S_0$, at least one candidate phase sequence is determined (770) based on the function of time, frequency, and phase, further based on a set $S_j$ (e.g., blocks 17 through 32) corresponding to stage $Z_i$, and further based on the sets preceding set $S_j$ (e.g., based on blocks 1 through 16), wherein an initial subsequence of each candidate phase sequence determined at stage $Z_i$ includes one of the candidate phase sequences determined at a stage $Z_{i-1}$ preceding stage $Z_i$. A time, a frequency, and a phase sequence that optimize the function of time, frequency, and phase are determined (780) based on the candidate phase sequence(s) determined at a last (final) processing stage among the subsequent processing stages. The determined time is outputted (790) as the time of arrival of the received signal.

Enhancing the resolution of the phase sequence search may increase accuracy and detection metrics. In some embodiments, a relatively low resolution may be used initially, and a search may be performed around the best phase candidates returned by the search. Given one or more K-block candidate sequences, sequence resolution may be further enhanced by performing a higher resolution search around each of the phase rotations in the sequence(s), i.e., in a neighborhood of the identified search results. For example, in the L=4 or $\pi/2$ radian spacing case (wherein possible phase rotations are 0, $\pi/2$, $\pi$ or $3\pi/2$), the accuracy of the final TOA result may be enhanced by further rotating each block in the sequence through the points $[-\pi/4, 0, \pi/4]$. The size of the space is $3^K$ in this case (because there are three possible rotations for each of K blocks), and the recursion and partition techniques described above are again applicable.

The signal blocks to be used with SCI may be determined using various metrics. It is not necessary to select the blocks to be continuous in time. For example, in the GSM case if there were a total of 24 possible blocks available for processing, one could use the 8 most likely blocks (or slots). These most likely blocks may be picked by their signal quality. One method of determining the signal quality is to have a site that receives the signal well (the primary site, for example) make this determination. In general, neither the size of the blocks nor the position of the blocks in time has to be fixed; rather, the SCI approach in various embodiments of the present disclosure allows a great degree of flexibility in how these are characteristics are selected.

It is also possible to apply the present disclosure to groups of blocks in a hierarchical manner. For example, given 48 blocks, the blocks may be divided into six groups of eight blocks each, and the SCI technique may be applied to each group independently. The resulting ambiguity functions may be further combined non-coherently. The combining is considered independent because each group of blocks has a separate reference block.

Processing for such non coherent case combining of multiple SCI blocks may be expressed as:

$$\arg\max_{\omega,\tau,\{L\}} |f(\omega, \tau, \{L\}^{K-N})| = \qquad (15)$$

$$\arg\max_{\omega,\tau,\{L\}^{K-N}} \sum_{n=1}^{N} \left| A_{1n}(\omega, \tau) \sum_{i=2}^{K/N} \exp(j2\pi L_{ijn}/L) A_{in}(\omega, \tau) \right|$$

where $\{L\}^{K-N}$ is the set of L-ary sequences of length (K−N); $A_{in}$ is the 2D ambiguity function of the i-th block of the n-th macro-block (in the example above, a macro block is a group of eight blocks); $A_{1n}$ is the reference block for the SCI combining of the n-th macro-block; and N is the number of macro-blocks (e.g., N=6 in the example above).

In some embodiments, the optimal sequence of phase shifts may be assumed to be identical for multiple diversity channels. Thus, in some embodiments, the final SCI ambiguity results for each candidate phase sequence may be added across multiple diversity channels. This summation may be performed non-coherently or sub-coherently (using one of the blocks on one of the channels as the reference phase block).

Processing for non-coherent summation across multiple diversity channels may be expressed as:

$$\arg\max_{\omega,\tau,\{L\}} |f(\omega, \tau, \{L\})| = \qquad (16)$$

$$\arg\max_{\omega,\tau,\{L\}} \sum_{c=1}^{num\_chans} \left| \sum_{i=1}^{K} \exp(j2\pi L_{ijc}/L) A_{ic}(\omega, \tau) \right|$$

where num_chaps is the number of diversity channels, and $L_{i\,jc}$ is the i-th L-ary symbol of the J-th sequence on channel c.

The sequence of phase shifts applied to respective blocks need not be arbitrary. For example, there may be memory in the phase as one proceeds from block to block. This is especially applicable in cases of slowly drifting, continuously transmitted signals. If the block size is appropriately chosen, a brownian motion-like model may be used that allows certain statistical inferences to be made about the future values based on the known or assumed current value. In such cases, the set of phase shifts on the (k+1)-th block may be restricted based on the decision for the previous (k-th) block. For instance, in the L-ary case, all L possibilities may be used to initialize a trellis at stage one corresponding to block 1. By restricting allowable paths to the appropriate subset of the full trellis and electing a winner at each stage, the scale of the search task may be simplified. This technique may reduce the number of sequences to be examined.

Just as the phase has been discretized in various embodiments, it is possible to discretize other variables such as the frequency. For example, if the frequency also drifts over various segments (blocks), one may consider a discrete set of frequency shifts along with the discrete phase shifts. An example is where in addition to the present frequency shift one also considers small frequency shifts above or below the present candidate.

In some embodiments, when memory exists in either the frequency domain or the phase domain, SCI implementation may be further improved by using a Viterbi decoder. With a Viterbi decoder, only a reduced number of candidate sequences may remain candidates at any given progression through the frequency/phase trellis; hence the workload on the detector may be greatly diminished.

In some embodiments, to aid the discovery of the optimal sequence of phase shifts, a site that observes a strong signal may estimate the phase for each coherent length of received signal and send information regarding the difference between successive phase shifts to the other sites. Such differential phase shift information may be applied by the other sites to reduce the complexity of their searches for the phase sequence. For example, assume that the following sequence of phases is measured at a site S1 that has a high signal-to-noise ratio: $\theta_1, \theta_2, \ldots, \theta_K$. Then site S1 may send the following sequence of phase deltas to the other sites: $\delta_1, \delta_2, \ldots, \delta_{K-1}$ where $\delta_{K-1} = \theta_K - \theta_{K-1}$ represents the phase shift necessary to align the k-th block to the (k−1)-th block. The delta phase sequence may be applied at the other sites to blocks 2 to K. Rather than signifying an absolute sequence of shifts, the delta phase sequence may also be used as a starting to point, around which the search for the optimal sequence may be conducted.

Simulation results using a GSM signal are now discussed. The GSM slots are assumed equivalent to the coherent blocks described above. The total number of slots available (e.g., K following the block notation above) is 48 with each slot containing 296 samples. In this simulation, a detection is defined as a peak that exceeded threshold and was within 0.15 GSM symbols from the true TOA. Coherent detection on a single slot fails at −10 dB SNR The detection probabilities are higher at 13 dB threshold, but the false alarm rate also increases. All simulations were conducted with 400 Hz frequency offset.

Figure 8:
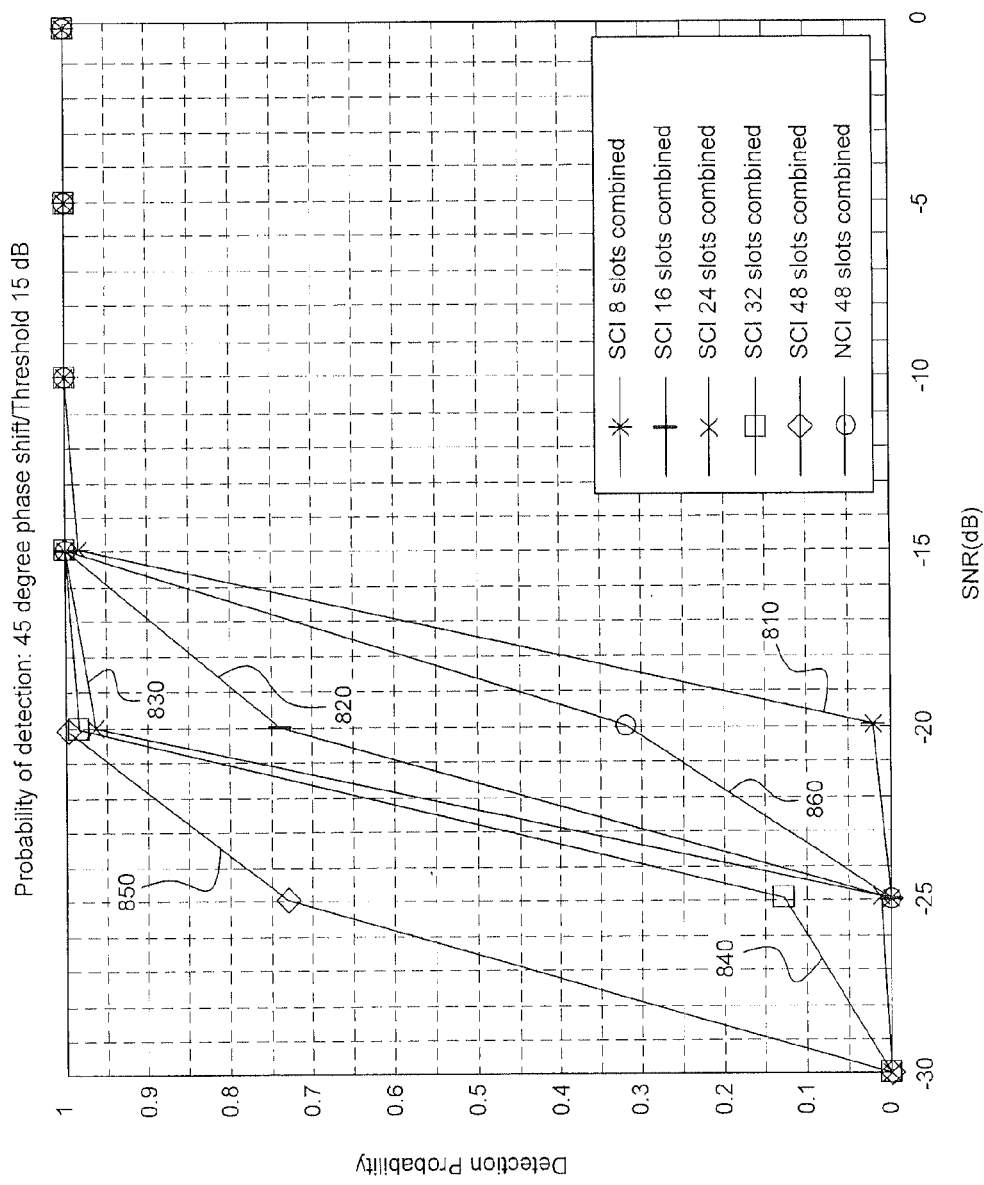
FIG. 8 is a plot of simulation results in accordance with some embodiments.

FIG. 8 shows the probability of detection of the TOA peak as a function of the number of combined slots (blocks) and the applied SNR. Plots 910, 920, 930, 940, and 950 correspond to SCI in which 8, 16, 24, 32, and 48 slots are combined, respectively. The plot 960 for the case of NCI is also shown for reference. Tables 5-8 below show additional performance results.

TABLE 5

Probability of detection for 45 degree phase shifts with 15 dB threshold

| Combined Slots | SNR | | | | |
|---|---|---|---|---|---|
| | 8 | 16 | 24 | 32 | 48 |
| −30 | 0 | 0 | 0 | 0 | 0.01 |
| −25 | 0 | 0 | 0.01 | 0.13 | 0.73 |
| −20 | 0.02 | 0.74 | 0.96 | 0.98 | 1 |
| −15 | 0.98 | 1 | 1 | 1 | 1 |
| −10 | 1 | 1 | 1 | 1 | 1 |
| −5 | 1 | 1 | 1 | 1 | 1 |
| 0 | 1 | 1 | 1 | 1 | 1 |

TABLE 6

Probability of detection for 45 degree phase shifts with 13 dB threshold

| Combined Slots | SNR | | | | |
|---|---|---|---|---|---|
| | 8 | 16 | 24 | 32 | 48 |
| −30 | 0 | 0 | 0 | 0.02 | 0.07 |
| −25 | 0 | 0.09 | 0.46 | 0.7 | 0.89 |
| −20 | 0.55 | 0.89 | 0.94 | 1 | 1 |
| −15 | 0.98 | 1 | 1 | 1 | 1 |
| −10 | 1 | 1 | 1 | 1 | 1 |
| −5 | 1 | 1 | 1 | 1 | 1 |
| 0 | 1 | 1 | 1 | 1 | 1 |

TABLE 7

Probability of detection for 90 degree phase shifts with 15 dB threshold

| Combined Slots | SNR | | | | |
|---|---|---|---|---|---|
| | 8 | 16 | 24 | 32 | 48 |
| −30 | 0 | 0 | 0 | 0 | 0 |
| −25 | 0 | 0 | 0 | 0.1 | 0.41 |
| −20 | 0.02 | 0.57 | 0.98 | 0.95 | 0.99 |
| −15 | 0.94 | 1 | 1 | 1 | 1 |
| −10 | 1 | 1 | 1 | 1 | 1 |
| −5 | 1 | 1 | 1 | 1 | 1 |
| 0 | 1 | 1 | 1 | 1 | 1 |

TABLE 8

Probability of detection for 90 degree phase shifts with 13 dB threshold

| Combined Slots | SNR | | | | |
|---|---|---|---|---|---|
| | 8 | 16 | 24 | 32 | 48 |
| −30 | 0 | 0 | 0 | 0 | 0.01 |
| −25 | 0 | 0.04 | 0.21 | 0.56 | 0.82 |
| −20 | 0.26 | 0.82 | 0.94 | 0.96 | 1 |
| −15 | 0.97 | 1 | 1 | 1 | 1 |
| −10 | 1 | 1 | 1 | 1 | 1 |
| −5 | 1 | 1 | 1 | 1 | 1 |
| 0 | 1 | 1 | 1 | 1 | 1 |

Referring to FIG. 8, relating to GSM, it is observed that SCI can match NCI detection with 8 slots at −15 dB SNR. Thus in lieu of using NCI with 48 slots, 6 SCI calculations may be performed with the same data. Thus, SCI may be used to generate 6 estimates of the TOA. Given these multiple TOA estimates, the best of these estimates may be determined by a further layer of processing (e.g., pick the earliest, or the median, etc.). Improved TOA estimation and hence improved location estimates may be obtained with SCI in cases where multiple slot integration is needed (e.g., with weak, intermittent signals).

Figure 9:
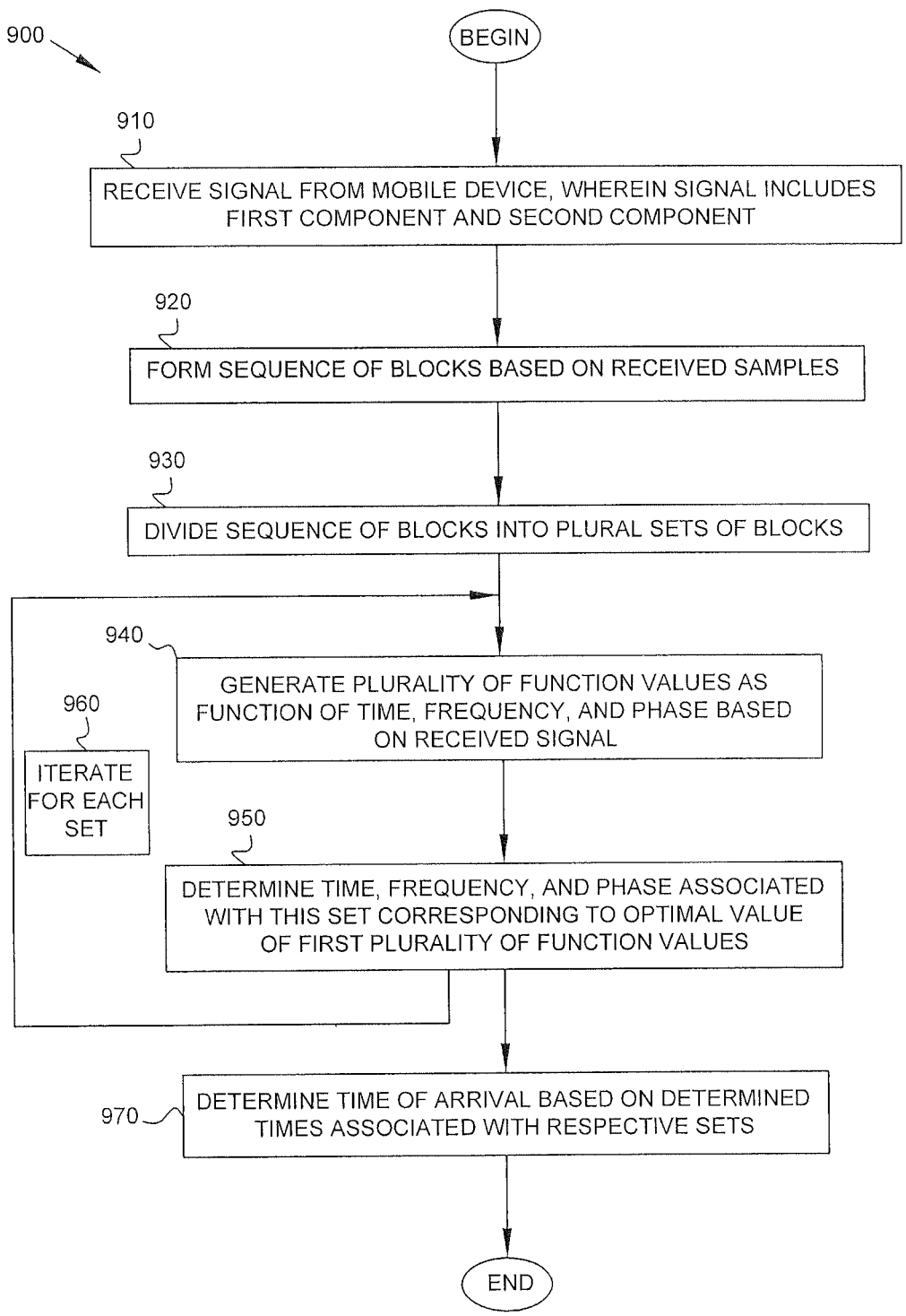
FIG. 9 is a flow diagram of a process of performing SCI multiple times over respective sets of blocks in accordance with some embodiments.

FIG. 9 is a flow diagram of a process of performing SCI multiple times over respective sets of blocks in accordance with some embodiments. After process 900 begins, a signal is received (910) from a mobile device as a plurality of data samples. The received signal includes a first component corresponding to a known reference signal and a second component corresponding to at least one of an unknown channel impairment and an unknown noise. A sequence of blocks (e.g., 48 blocks in the example above) is formed (920) based on the received samples. The sequence of blocks is divided (930) into plural sets of blocks (e.g., six sets of blocks in the example above). For each set, the first component of the received signal corresponding to the reference signal is known to within a constant phase shift over each block in said set. For each set, a plurality of function values is generated (940) as a function of time, frequency, and phase, based on the received signal, The function values of the plurality correspond to a plurality of times, a plurality of frequencies, and a first plurality of phase sequences. For each set (iteration 960 in FIG. 9), a time, a frequency, and a phase sequence associated with that set and corresponding to an optimal value of the first plurality of function values are determined (950). A time of arrival of the signal is determined (970) based on the determined times associated with respective sets.

The present disclosure can be implemented by a general purpose computer programmed in accordance with the principals discussed herein. It may be emphasized that the above-described embodiments, particularly any "preferred" embodiments, are merely possible examples of implementations, merely set forth for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure and the present disclosure and protected by the following claims.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a computer readable medium. The computer readable medium can be a machine-readable storage device, a machine-readable storage substrate, a memory device, or a combination of one or more of them.

The term "processor" encompasses all apparatus, devices, and machines for processing data, including by way of example a programmable processor, a computer, or multiple processors or computers. The processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more data memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer readable media suitable for storing computer program instructions and data include all forms data memory including non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Those skilled in the art will appreciate that the present invention can be practiced by other than the described embodiments, which are presented for the purposes of illustration and not of limitation, and the present invention is limited only by the claims which follow.

What is claimed is:

1. A method for determining a time of arrival of a signal transmitted by a mobile device, the method comprising:
    receiving a signal from a mobile device as a plurality of data samples, the received signal including a first component corresponding to a known reference signal and a second component corresponding to at least one of an unknown channel impairment and an unknown noise;
    forming a sequence of blocks based on the received samples, wherein the first component of the received signal corresponding to the reference signal is known to within a constant phase shift over each block; generating a first plurality of function values as a function of time, frequency, and phase, based on the received signal, wherein the function values of the first plurality correspond to a plurality of times, a plurality of frequencies, and a plurality of phase sequences, and the function values of the first plurality are calculated to compensate for frequency and phase discontinuities and drift; determining a time, a frequency, and a phase sequence corresponding to an optimal value of the first plurality of function values; and outputting the determined time as the time of arrival of the received signal.

2. The method of claim 1, wherein the optimal value is a function value having a maximal magnitude.

3. The method of claim 1, wherein the blocks in the sequence of blocks include a common number of samples.

4. The method of claim 1, wherein generating the first plurality of function values includes computing:

$$f(\omega, \tau, \Phi) = \exp(j\phi_1)\sum_{n=1}^{m} s_1(n+\tau)*r_1(n)\exp(-jn\omega) + \ldots + \exp(j\phi_K)\sum_{n=M-m+1}^{M} s_k(n+\tau)*r_k(n)\exp(-jn\omega),$$

wherein * denotes complex conjugation, $\omega$ represents frequency, $\tau$ represents time, $\Phi$ represents the sequence of phase values $\phi_1, \ldots, \phi_K$, s represents the received signal, r represents the reference signal, subscripts to s and r represent portions of those signals corresponding to respective blocks, m represents a number of samples in each block, M represents a total number of received samples, and K represents a number of blocks in the sequence of blocks.

5. The method of claim 1, wherein each phase sequence in the plurality of phase sequences is a sequence of phase values associated with respective blocks, and the phase values of each phase sequence in the first plurality are separated from one another by multiples of a phase spacing.

6. The method of claim 1, wherein forming the sequence of blocks based on the received samples includes forming a reference block and a non-reference block, wherein a phase value associated with the reference block in the determined phase sequence is known to be zero.

7. The method of claim 1, wherein each phase sequence in the plurality of phase sequences is a sequence of phase values associated with respective blocks, the method further including searching for a refined set of inputs that optimizes the function of time, frequency, and phase by searching a neighborhood around each phase value in the determined phase sequence.

8. The method of claim 1, wherein generating the first plurality of function values includes:
    generating, for each block, a second plurality of function values as a function of time and frequency, based on the received signal, wherein the function values of the second plurality correspond to the plurality of times and to the plurality of frequencies; and
    for each time in the plurality of times, each frequency in the plurality of frequencies, and each phase sequence in the first plurality of phase sequences:
        for each block, shifting the function value in the second plurality corresponding to said time, said frequency, and said block by a phase value of said phase sequence associated with said block, to generate a shifted value for said block; and
        adding the shifted values for the respective blocks, to generate the function value in the first plurality corresponding to said time, frequency, and phase sequence.

9. The method of claim 1, wherein each phase sequence in the plurality of phase sequences is a sequence of phase values associated with respective blocks, and wherein generating the first plurality of function values includes:

generating, for each block, a second plurality of function values as a function of time and frequency, based on the received signal, wherein the function values of the second plurality correspond to the plurality of times and to the plurality of frequencies;

sorting the phase sequences in the plurality of phase sequences into a sequence of phase sequences according to an order, wherein each pair of adjacent phase sequences in the sequence of phase sequences differ at exactly one phase value and are equal to one another at the other phase values; and for each time and frequency:
evaluating the function of time, frequency, and phase at said time, said frequency, and an initial phase sequence in the sequence of phase sequences, and
evaluating the function of time, frequency, and phase at said time, said frequency, and each phase sequence other than said initial phase sequence sequentially according to the order, by adjusting a function value of said function of time, frequency, and phase at said time, said frequency, and a predecessor phase sequence with a term dependent on the function value in the second plurality corresponding to said time, said frequency, and the block associated with the phase values that differ between said phase sequence and said predecessor phase sequence.

10. The method of claim 9, wherein the phase values of each phase sequence are each expressible as $2*\pi*k/L$, wherein L is an integer, and k is an integer greater than or equal to 0 and less than or equal to L−1.

11. The method of claim 1, wherein each phase sequence in the plurality of phase sequences is a sequence of phase values associated with respective blocks, and the sequence of blocks includes K blocks, and the phase values of each phase sequence are each expressible as $2*\pi*k/L$, wherein L is an integer, and k is an integer greater than or equal to 0 and less than or equal to L−1, the method further comprising:

determining a plurality of codes, each code having K symbols, one symbol corresponding to each block, each symbol being mappable to a value between 0 and L−1, wherein the plurality of codes are a closed group under an algebraic operation;

determining a representative set of codes in the plurality of codes, wherein the representative set is a subgroup of the closed group;

for each code in the representative set, providing a phase sequence in said plurality of phase sequences based on said code, wherein each phase value of said phase sequence is assigned as $2*\pi*p/L$, wherein p is a symbol of said code corresponding to the block associated with said phase value, to provide the plurality of phase sequences.

12. The method of claim 1, wherein each received sample is in one of the blocks.

13. The method of claim 1, wherein forming the sequence of blocks based on the received samples includes:

dividing the received samples into a plurality of blocks;
sorting the plurality of blocks according to a predetermined metric; and
determining a subset of the sorted plurality of blocks that satisfy a predetermined condition; and
providing the determined subset as the sequence of blocks.

14. A non-transitory computer readable storage medium having instructions stored tangibly thereon, the instructions when executed by a processor causing the processor to perform the operations of:

receiving a signal from a mobile device as a plurality of data samples, the received signal including a first component corresponding to a known reference signal and a second component corresponding to at least one of an unknown channel impairment and an unknown noise;
forming a sequence of blocks based on the received samples, wherein the first component of the received signal corresponding to the reference signal is known to within a constant phase shift over each block; generating a first plurality of function values as a function of time, frequency, and phase, based on the received signal, wherein the function values of the first plurality correspond to a plurality of times, a plurality of frequencies, and a plurality of phase sequences, and the function values of the first plurality are calculated to compensate for frequency and phase discontinuities and drift; determining a time, a frequency, and a phase sequence corresponding to an optimal value of the first plurality of function values; and outputting the determined time as the time of arrival of the received signal.

15. The computer readable storage medium of claim 14, wherein each phase sequence in the plurality of phase sequences is a sequence of phase values associated with respective blocks, and wherein causing the processor to perform the generation of the first plurality of function values includes causing the processor to perform the operations of:

generating, for each block, a second plurality of function values as a function of time and frequency, based on the received signal, wherein the function values of the second plurality correspond to the plurality of times and to the plurality of frequencies;

sorting the phase sequences in the plurality of phase sequences into a sequence of phase sequences according to an order, wherein each pair of adjacent phase sequences in the sequence of phase sequences differ at exactly one phase value and are equal to one another at the other phase values; and for each time and frequency:
evaluating the function of time, frequency, and phase at said time, said frequency, and an initial phase sequence in the sequence of phase sequences, and
evaluating the function of time, frequency, and phase at said time, said frequency, and each phase sequence other than said initial phase sequence sequentially according to the order, by adjusting a function value of said function of time, frequency, and phase at said time, said frequency, and a predecessor phase sequence with a term dependent on the function value in the second plurality corresponding to said time, said frequency, and the block associated with the phase values that differ between said phase sequence and said predecessor phase sequence.

16. The computer readable storage medium of claim 14, wherein each phase sequence in the plurality of phase sequences is a sequence of phase values associated with respective blocks, and the sequence of blocks includes K blocks, and the phase values of each phase sequence are each expressible as $2*\pi*k/L$, wherein L is an integer, and k is an integer greater than or equal to 0 and less than or equal to L−1, wherein the instructions when executed by the processor further cause the processor to perform the operations of:

determining a plurality of codes, each code having K symbols, one symbol corresponding to each block, each symbol being mappable to a value between 0 and L−1, wherein the plurality of codes are a closed group under an algebraic operation;

determining a representative set of codes in the plurality of codes, wherein the representative set is a subgroup of the closed group;

for each code in the representative set, providing a phase sequence in said plurality of phase sequences based on said code, wherein each phase value of said phase sequence is assigned as $2*\pi*p/L$, wherein p is a symbol of said code corresponding to the block associated with said phase value, to provide the plurality of phase sequences.

17. A method for determining a time of arrival of a signal transmitted by a mobile device, the method comprising:

receiving a signal from a mobile device as a plurality of data samples, the received signal including a first component corresponding to a known reference signal and a second component corresponding to at least one of an unknown channel impairment and an unknown noise; forming a sequence of blocks based on the received samples; dividing the sequence of blocks into plural sets of blocks, wherein for each set, the first component of the received signal corresponding to the reference signal is known to within a constant phase shift over each block in said set; for each set: generating a plurality of function values as a function of time, frequency, and phase, based on the received signal, wherein the function values of the plurality correspond to a plurality of times, a plurality of frequencies, and a first plurality of phase sequences, and the function values are calculated to compensate for frequency and phase discontinuities and drift, and determining a time, a frequency, and a phase sequence associated with said set corresponding to an optimal value of the first plurality of function values; and determining the time of arrival based on the determined times associated with respective sets.

18. The method of claim 17, wherein determining the time of arrival includes selecting an earliest time among the determined times associated with respective sets.

19. The method of claim 17, wherein determining the time of arrival includes selecting a median time among the determined times associated with respective sets.

20. A method for determining a time of arrival of a signal transmitted by a mobile device, the method comprising:

receiving a signal from a mobile device as a plurality of data samples, the received signal including a first component corresponding to a known reference signal and a second component corresponding to at least one of an unknown channel impairment and an unknown noise;

forming a sequence of blocks based on the received samples, wherein the first component of the received signal corresponding to the reference signal is known to within a constant phase shift over each block;

generating, for each block, a first plurality of function values as a function of time and frequency, based on the received signal, wherein the function values of the first plurality correspond to a plurality of times and to a plurality of frequencies;

sorting the sequence of blocks according to a predetermined metric;

dividing the sorted sequence of blocks into plural sets of blocks, wherein the sets are ranked according to an order;

at an initial processing stage $Z_0$, determining at least one candidate phase sequence based on a function of time, frequency, and phase and based on an initial set $S_0$ among the sets of blocks;

at each stage $Z_i$ of one or more subsequent processing stages corresponding to respective distinct sets other than said initial set $S_0$, determining at least one candidate phase sequence based on the function of time, frequency, and phase, further based on a set $S_j$ corresponding to said processing stage, and further based on the sets preceding set $S_j$, wherein an initial subsequence of each candidate phase sequence determined at stage $Z_i$ includes one of the candidate phase sequences determined at a stage $Z_{i-1}$ preceding stage $Z_i$;

determining a time, a frequency, and a phase sequence that optimize the function of time, frequency, and phase based on the at least one candidate phase sequence determined at a last processing stage among the subsequent processing stages; and outputting the determined time as the time of arrival of the received signal.

* * * * *